(12) United States Patent
Lim

(10) Patent No.: US 12,470,844 B2
(45) Date of Patent: Nov. 11, 2025

(54) IMAGE SENSING DEVICE AND AUTOMOTIVE DEVICE

(71) Applicant: Samsung Electronics Co., Ltd., Suwon-si (KR)

(72) Inventor: Jung Wook Lim, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 75 days.

(21) Appl. No.: 18/524,586

(22) Filed: Nov. 30, 2023

(65) Prior Publication Data

US 2024/0284061 A1 Aug. 22, 2024

(30) Foreign Application Priority Data

Feb. 16, 2023 (KR) .......................... 10-2023-0020852

(51) Int. Cl.
| | |
|---|---|
| *H04N 25/59* | (2023.01) |
| *H04N 25/46* | (2023.01) |
| *H04N 25/766* | (2023.01) |
| *H04N 25/76* | (2023.01) |

(52) U.S. Cl.
CPC ............. *H04N 25/59* (2023.01); *H04N 25/46* (2023.01); *H04N 25/766* (2023.01); *H04N 25/7795* (2023.01)

(58) Field of Classification Search
CPC ........................... H04N 25/59; H04N 25/7795
See application file for complete search history.

(56) References Cited

U.S. PATENT DOCUMENTS

| | | | |
|---|---|---|---|
| 8,582,009 B2 * | 11/2013 | Kono | H04N 25/778 |
| | | | 348/308 |
| 9,025,063 B2 * | 5/2015 | Ahn | H10F 39/80373 |
| | | | 257/446 |
| 10,389,958 B2 | 8/2019 | Hanzawa et al. | |
| 10,791,292 B1 * | 9/2020 | Geurts | H04N 25/771 |
| 11,310,447 B2 | 4/2022 | Yun et al. | |
| 11,350,044 B2 | 5/2022 | Mori et al. | |
| 11,665,444 B2 * | 5/2023 | Kim | H04N 25/585 |
| | | | 348/294 |

(Continued)

FOREIGN PATENT DOCUMENTS

| | | |
|---|---|---|
| KR | 100790582 B1 | 1/2008 |
| KR | 10-2008-0030091 A | 4/2008 |

*Primary Examiner* — Cynthia Segura
(74) *Attorney, Agent, or Firm* — Harness, Dickey & Pierce, P.L.C.

(57) ABSTRACT

An image sensing device includes a pixel array including a plurality of unit pixels, and a driving unit configured to drive each unit pixel of the plurality of unit pixels. Each unit pixel comprises: a first region including a first photodiode, a first floating diffusion region, and a second floating diffusion region, a second region including a second photodiode and a third floating diffusion region, and a floating diffusion (FD) connecting transistor connected to any one of the first floating diffusion region, the second floating diffusion region or the third floating diffusion region. The driving unit is configured to alternately perform a normal operation of individually operating the plurality of unit pixels, and a binning operation of grouping at least two unit pixels of the plurality of unit pixels and operating the at least two unit pixels simultaneously.

20 Claims, 19 Drawing Sheets

(56) References Cited

U.S. PATENT DOCUMENTS

| | | | |
|---|---|---|---|
| 11,743,610 B2* | 8/2023 | Park | H04N 25/59 |
| | | | 348/207.99 |
| 12,022,212 B2* | 6/2024 | Choi | H04N 25/78 |
| 2005/0189472 A1* | 9/2005 | Asaba | H04N 25/46 |
| | | | 348/E3.018 |
| 2017/0302872 A1 | 10/2017 | Tanaka et al. | |
| 2020/0162691 A1* | 5/2020 | Mori | H10F 39/813 |
| 2021/0136303 A1* | 5/2021 | Kim | H04N 25/704 |
| 2021/0289156 A1 | 9/2021 | Hanzawa et al. | |
| 2022/0006967 A1 | 1/2022 | Asakura | |
| 2022/0038651 A1 | 2/2022 | Kang et al. | |
| 2022/0102403 A1 | 3/2022 | Ma et al. | |
| 2022/0217291 A1* | 7/2022 | Kim | H04N 25/78 |
| 2022/0337764 A1* | 10/2022 | Choi | H10F 39/807 |
| 2024/0406591 A1* | 12/2024 | Lim | H10F 39/813 |

\* cited by examiner

IMAGE SENSING DEVICE AND AUTOMOTIVE DEVICE

CROSS-REFERENCE TO RELATED APPLICATION

This application claims priority from Korean Patent Application No. 10-2023-0020852 filed on Feb. 16, 2023 in the Korean Intellectual Property Office, the disclosure of which is incorporated herein by reference in its entirety.

BACKGROUND

1. Field

The present inventive concepts relate to image sensing devices and automotive devices including the same.

2. Description of the Related Art

An image sensing device is one of semiconductor elements that convert optical information into an electric signal. Such an image sensing device may include a charge coupled device (CCD) image sensing device and a complementary metal-oxide semiconductor (CMOS) image sensing device.

The CMOS image sensor may be abbreviated as CIS (CMOS image sensor). The CIS may include a plurality of pixels arranged two-dimensionally. Each pixel may include, for example, a photodiode (PD). The photodiode may serve to convert incident light into an electrical signal.

In recent years, with the development of computer industry and communication industry, the demand for image sensors with improved performance has increased in various fields such as a digital camera, a camcorder, a smartphone, a game console, a security camera, a medical micro camera, a robot and an automotive device.

SUMMARY

Some example embodiments of the present inventive concepts provide an image sensing device having an image quality with improved SNR dip in an illuminance of a dynamic range.

Some example embodiments of the present inventive concepts also provide an automotive device including the image sensing device having an image quality with improved SNR dip in an illuminance of a dynamic range.

Some example embodiments of the present inventive concepts provide an image sensing device that may include a pixel array including a plurality of unit pixels, and a driving unit which is configured to drive each unit pixel of the plurality of unit pixels. Each unit pixel of the plurality of unit pixels may include: a first region including a first photodiode, a first floating diffusion region, and a second floating diffusion region, a second region including a second photodiode and a third floating diffusion region, and a floating diffusion (FD) connecting transistor connected to any one of the first floating diffusion region, the second floating diffusion region, or the third floating diffusion region. The driving unit may be configured to alternately perform a normal operation of individually operating the plurality of unit pixels, and a binning operation of grouping at least two unit pixels of the plurality of unit pixels and operating the at least two unit pixels simultaneously.

Some example embodiments of the present inventive concepts provide an image sensing device that may include: a pixel array including a plurality of unit pixels, and is configured to drive each unit pixel of the plurality of unit pixels to output an output signal. Each unit pixel of the plurality of unit pixels may include a first photodiode, a first transfer transistor which is configured to switch whether to transfer a first electric charge sensed by the first photodiode to a first node in which a first floating diffusion region is formed, a switching transistor which is connected between the first node and a second node in which a second floating diffusion region is formed, a source follower transistor having a gate connected to the first node, the source follower transistor configured to generate the output signal, a connecting transistor connected between the second node and a third node in which a third floating diffusion region is formed, a second photodiode, a second transfer transistor which is configured to switch whether to transfer a second electric charge sensed by the second photodiode to the third node, a reset transistor connected to the second node, a capacitor connected to the third node and a floating diffusion connecting transistor having one end connected to any one of the first node, the second node, or the third node. The driving unit may be configured to alternately perform a normal operation in which the FD connecting transistor is turned off and a binning operation in which the FD connecting transistor is turned on.

Some example embodiments of the present inventive concepts provide an image sensing device implemented in an automotive device, wherein the image sensing device includes a pixel array including a plurality of unit pixels and a driving unit that is configured to drive each unit pixel of the plurality of unit pixels, where each unit pixel of the plurality of unit pixels may include: a first photodiode, a first transfer transistor connected between the first photodiode and a first node in which a first floating diffusion region is formed, a switching transistor connected between the first node and a second node in which a second floating diffusion region is formed, a source follower transistor which has a gate connected to the first node, and a source and a drain connected to an output signal line such that the source follower transistor is configured to generate first to fifth output signals, a connecting transistor connected between the second node and a third node in which a third floating diffusion region is formed, a second photodiode, a second transfer transistor connected between the second photodiode and the third node, a reset transistor connected between the second node and a first power supply voltage, a capacitor connected between the third node and a second power supply voltage, and a floating diffusion connecting transistor having one end connected to the second node.

However, example embodiments of the present inventive concepts are not restricted to the example embodiments set forth herein. The above and other aspects of the present inventive concepts will become more apparent to one of ordinary skill in the art to which the present inventive concepts pertain by referencing the detailed description of the present inventive concepts given below.

DETAILED DESCRIPTION

Figure 1:
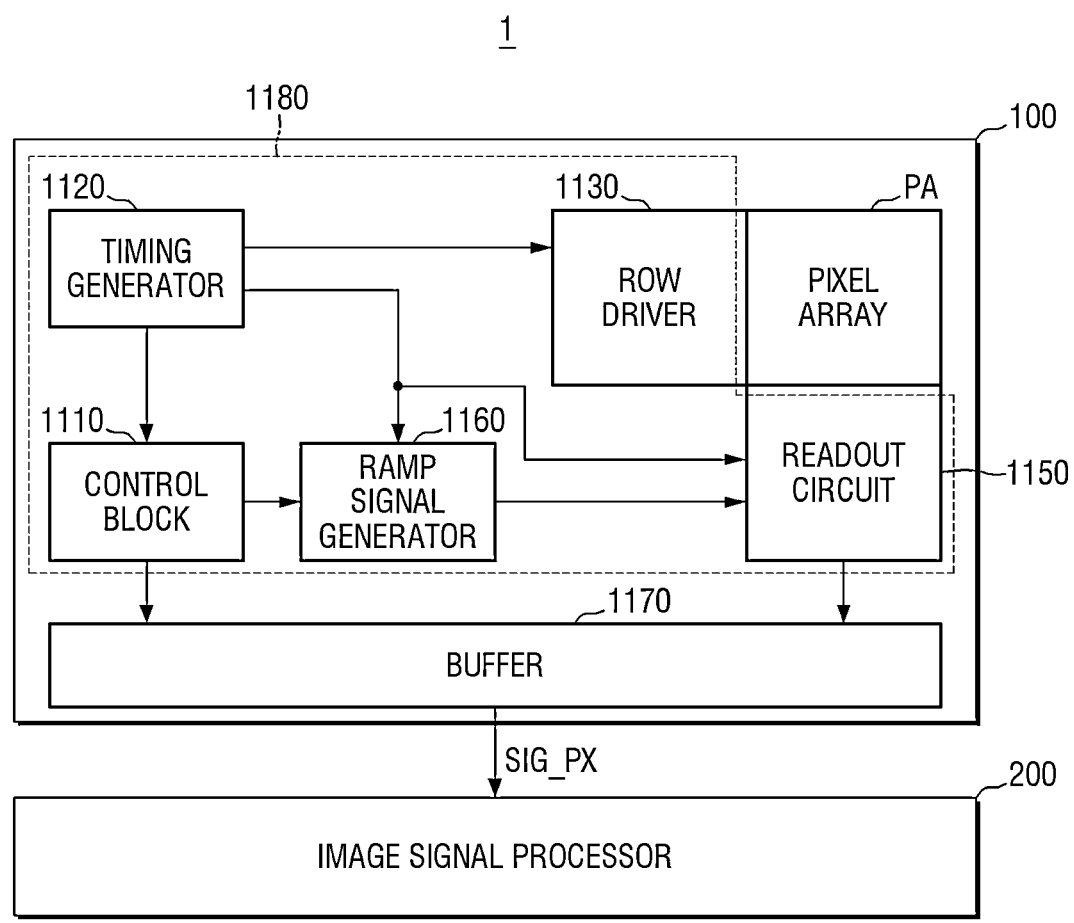
FIG. 1 is a block diagram of an image sensing device according to some example embodiments.

Hereinafter, some example embodiments according to the technical concepts of the present inventive concepts will be described with reference to the accompanying drawings. As those skilled in the art would realize, the described example embodiments may be modified in various different ways, all without departing from the spirit or scope of the present inventive concepts.

In order to clearly describe the present inventive concepts, parts or portions that are irrelevant to the description are omitted, and identical or similar constituent elements throughout the specification are denoted by the same reference numerals.

Further, in the drawings, the size and thickness of each element are arbitrarily illustrated for ease of description, and the present inventive concepts are not necessarily limited to those illustrated in the drawings.

Throughout the specification, when a part is "connected" to another part, it includes not only a case where the part is "directly connected" but also a case where the part is "indirectly connected" with another part in between. In addition, unless explicitly described to the contrary, the word "comprise" and variations such as "comprises" or "comprising" will be understood to imply the inclusion of stated elements but not the exclusion of any other elements.

It will be understood that when an element such as a layer, film, region, area, or substrate is referred to as being "on" or "above" another element, it can be directly on the other element or intervening elements may also be present. In contrast, when an element is referred to as being "directly on" another element, there are no intervening elements present. Further, in the specification, the word "on" or "above" means positioned on or below the object portion, and does not necessarily mean positioned on the upper side of the object portion based on a gravitational direction.

The use of the term "the" and similar demonstratives may correspond to both the singular and the plural. Operations constituting methods may be performed in any suitable order unless otherwise indicated herein or otherwise clearly contradicted by context and are not necessarily limited to the stated order.

The use of all illustrations or illustrative terms in some example embodiments is simply to describe the technical ideas in detail, and the scope of the present inventive concepts is not limited by the illustrations or illustrative terms unless they are limited by claims.

It will be understood that elements and/or properties thereof (e.g., structures, surfaces, directions, or the like), which may be referred to as being "perpendicular," "parallel," "coplanar," or the like with regard to other elements and/or properties thereof (e.g., structures, surfaces, directions, or the like) may be "perpendicular," "parallel," "coplanar," or the like or may be "substantially perpendicular," "substantially parallel," "substantially coplanar," respectively, with regard to the other elements and/or properties thereof.

Elements and/or properties thereof (e.g., structures, surfaces, directions, or the like) that are "substantially perpendicular", "substantially parallel", or "substantially coplanar" with regard to other elements and/or properties thereof will be understood to be "perpendicular", "parallel", or "coplanar", respectively, with regard to the other elements and/or properties thereof within manufacturing tolerances and/or material tolerances and/or have a deviation in magnitude and/or angle from "perpendicular", "parallel", or "coplanar", respectively, with regard to the other elements and/or properties thereof that is equal to or less than 10% (e.g., a. tolerance of ±10%).

It will be understood that elements and/or properties thereof may be recited herein as being "the same" or "equal" as other elements, and it will be further understood that elements and/or properties thereof recited herein as being "identical" to, "the same" as, or "equal" to other elements may be "identical" to, "the same" as, or "equal" to or "substantially identical" to, "substantially the same" as or "substantially equal" to the other elements and/or properties thereof. Elements and/or properties thereof that are "substantially identical" to, "substantially the same" as or "substantially equal" to other elements and/or properties thereof will be understood to include elements and/or properties thereof that are identical to, the same as, or equal to the other elements and/or properties thereof within manufacturing tolerances and/or material tolerances. Elements and/or properties thereof that are identical or substantially identical to and/or the same or substantially the same as other elements and/or properties thereof may be structurally the same or substantially the same, functionally the same or substantially the same, and/or compositionally the same or substantially the same. While the term "same," "equal" or "identical" may be used in description of some example embodiments, it should be understood that some imprecisions may exist. Thus, when one element is referred to as being the same as another element, it should be understood that an element or a value is the same as another element within a desired manufacturing or operational tolerance range (e.g., ±10%).

It will be understood that elements and/or properties thereof described herein as being "substantially" the same and/or identical encompasses elements and/or properties thereof that have a relative difference in magnitude that is equal to or less than 10%. Further, regardless of whether elements and/or properties thereof are modified as "substantially," it will be understood that these elements and/or properties thereof should be construed as including a manufacturing or operational tolerance (e.g., ±10%) around the stated elements and/or properties thereof.

When the terms "about" or "substantially" are used in this specification in connection with a numerical value, it is intended that the associated numerical value includes a manufacturing or operational tolerance (e.g., ±10%) around the stated numerical value. Moreover, when the words "about" and "substantially" are used in connection with geometric shapes, it is intended that precision of the geometric shape is not required but that latitude for the shape is within the scope of the disclosure. Further, regardless of whether numerical values or shapes are modified as "about" or "substantially," it will be understood that these values and shapes should be construed as including a manufacturing or operational tolerance (e.g., ±10%) around the stated numerical values or shapes. When ranges are specified, the range includes all values therebetween such as increments of 0.1%.

As described herein, when an operation is described to be performed, or an effect such as a structure is described to be established "by" or "through" performing additional operations, it will be understood that the operation may be performed and/or the effect/structure may be established "based on" the additional operations, which may include performing said additional operations alone or in combination with other further additional operations.

As described herein, an element that is described to be "spaced apart" from another element, in general and/or in a particular direction (e.g., vertically spaced apart, laterally spaced apart, etc.) and/or described to be "separated from" the other element, may be understood to be isolated from direct contact with the other element, in general and/or in the particular direction (e.g., isolated from direct contact with the other element in a vertical direction, isolated from direct contact with the other element in a lateral or horizontal direction, etc.). Similarly, elements that are described to be "spaced apart" from each other, in general and/or in a particular direction (e.g., vertically spaced apart, laterally spaced apart, etc.) and/or are described to be "separated" from each other, may be understood to be isolated from direct contact with each other, in general and/or in the particular direction (e.g., isolated from direct contact with each other in a vertical direction, isolated from direct contact with each other in a lateral or horizontal direction, etc.). Similarly, a structure described herein to be between two other structures to separate the two other structures from each other may be understood to be configured to isolate the two other structures from direct contact with each other.

FIG. 1 is a block diagram of an image sensing device according to some example embodiments.

Referring to FIG. 1, the image sensing device 1 may include an image sensor 100 and an image signal processor 200.

The image sensor 100 may sense an image of a sensing target using light to generate a pixel signal SIG_PX. In some example embodiments, the generated pixel signal SIG_PX may be, for example, a digital signal, but example embodiments according to the technical idea of the present inventive concepts are not limited thereto. Also, the pixel signal SIG_PX may include a specific signal voltage, a reset voltage, and the like.

The pixel signal SIG_PX may be provided to the image signal processor 200 and processed therein. The image signal processor 200 receives the pixel signal SIG_PX that is output from a buffer 1170 of the image sensor 100, and may process or treat the received pixel signal SIG_PX to easily display the pixel signal.

In some example embodiments, the image signal processor 200 may perform digital-binning on the pixel signal SIG_PX that is output from the image sensor 100. At this time, the pixel signal SIG_PX that is output from the image sensor 100 may be a raw image signal from the pixel array PA without analog-binning, and may also be the pixel signal SIG_PX on which the analog-binning has already been performed.

In some example embodiments, the image sensor 100 and the image signal processor 200 may be placed separately from each other as shown. For example, the image sensor 100 may be mounted on a first chip and the image signal processor 200 may be mounted on a second chip to communicate with each other through a particular (or, alternatively, predetermined) interface. However, the example embodiments are not limited thereto, and the image sensor 100 and the image signal processor 200 may be implemented as a single package, for example, a MCP (multi-chip package).

The image sensor 100 may include a control register block 1110, a timing generator 1120, a row driver 1130, a pixel array PA, a readout circuit 1150, a ramp signal generator 1160, and a buffer 1170.

The control register block 1110 may generally control the operation of the image sensor 100. In particular, the control register block 1110 may directly transmit an operating signal to the timing generator 1120, the ramp signal generator 1160, and the buffer 1170.

The timing generator 1120 may generate a signal that serves as a reference for the operating timing of various components of the image sensor 100. An operating timing reference signal generated by the timing generator 1120 may be sent to the row driver 1130, the readout circuit 1150, the ramp signal generator 1160, and the like.

The ramp signal generator 1160 may generate and transmit the ramp signal that is used in the readout circuit 1150. For example, the readout circuit 1150 may include a correlated double sampler (CDS), a comparator, or the like. The ramp signal generator 1160 may generate and transmit the ramp signal that is used in the correlated double sampler, the comparator, or the like.

The buffer 1170 may include, for example, a latch. The buffer 1170 may temporarily store the image signal IMS to be provided to the outside, and may transmit the pixel signal SIG_PX to an external memory or an external device. The buffer 1170 may include a memory such as a DRAM or an SRAM.

The pixel array PA may sense (e.g., capture, generate, etc.) an external image. The pixel array PA may include a plurality of pixels (or unit pixels). The row driver 1130 may selectively activate rows of the pixel array PA.

The readout circuit 1150 may sample the pixel signal provided from the pixel array PA, compare the pixel signal with the ramp signal, and then convert an analog image signal (data) into a digital image signal (data) on the basis of the comparison results. In some example embodiments, one or more of the control register block 1110, the timing generator 1120, the row driver 1130, the ramp signal generator 1160, the readout circuit 1150, or any combination thereof maybe understood to define a driving unit 1180 that is configured to drive a plurality of unit pixels of the pixel array PA. In some example embodiments, some or all of the operations performed with regard to one or more unit pixels in the pixel array PA may be understood to be performed by one or more portions of the driving unit 1180. The driving unit 1180 may be electrically connected to gates of transistors included in unit pixels of the pixel array PA and may be configured to transmit corresponding signals to the gates of the transistors to cause the transistors to be in and/or switch between one or more states (e.g., turned on or turned off).

Figure 2:
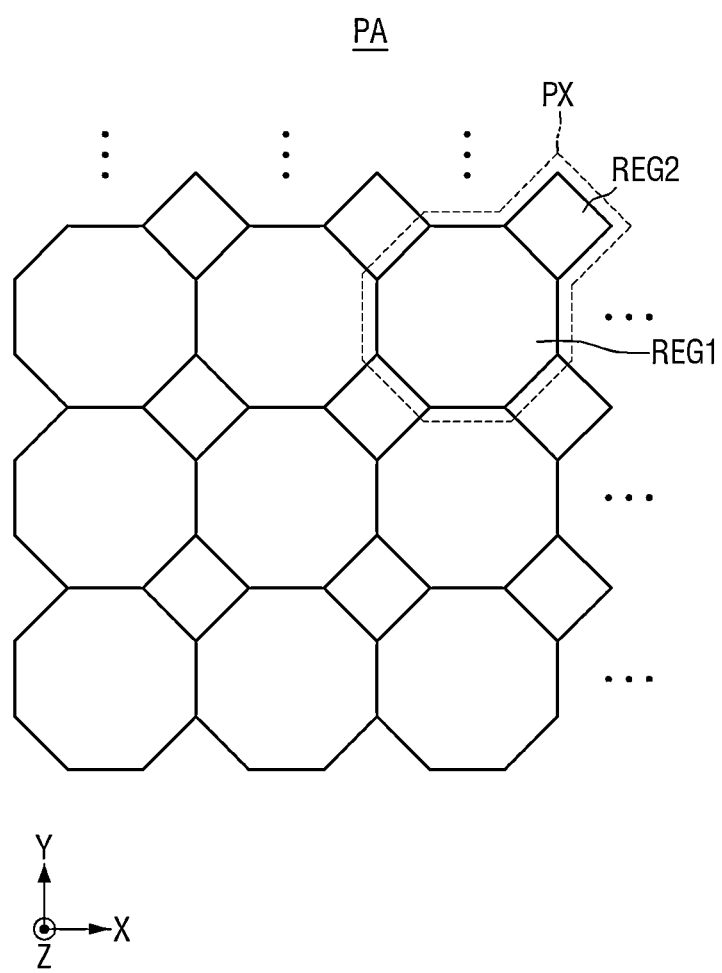
FIG. 2 is a top view of the pixel array according to some example embodiments.

FIG. 2 is a top view of the pixel array according to some example embodiments.

Referring to FIG. 2, the pixel array PA may include a plurality of unit pixels PX. For example, the plurality of unit pixels PX may be arranged regularly in the first direction X and the second direction Y. Here, the unit pixel PX may be a unit of regions and/or subpixels that receives light and outputs an image corresponding to one pixel.

A dynamic range used in the automotive device needs to satisfy at least 1120 dB, and the image sensor may be implemented as unit pixels including photodiodes of the type of FIG. 2 to satisfy such a dynamic range.

For example, the unit pixel PX may include a first region REG1 and a second region REG2. In some example embodiments, the first region REG1 may be referred to as a first sub-pixel and the second region REG2 may be referred to as a second sub-pixel. Here, the first region REG1 and the second region REG2 may be distinguished when viewed from above. The first region REG1 may have an octagonal shape as shown, and the second region REG2 may have a square shape as shown. However, the example embodiments of the present inventive concepts are not limited thereto. The first region REG1 and the second region REG2 may come into contact with each other (e.g., may be in direct contact with each other). The sensitivities of the first region REG1 and the second region REG2 are different from each other. For example, the sensitivity of the second region REG2 may be set (e.g., configured) to be low, and the first region REG1 may be implemented (e.g., configured) to have sensitivity higher than that of the second region REG2.

An area of the first region REG1 may be larger than an area of the second region REG2. That is, an amount of light incident on the first region REG1 may be greater than an amount of light incident on the second region REG2. A unit pixel PX corresponding to the first region REG1 and the second region REG2 may convert light (e.g., photoelectrically convert absorbed incident light) to generate an electrical signal.

Figure 3:
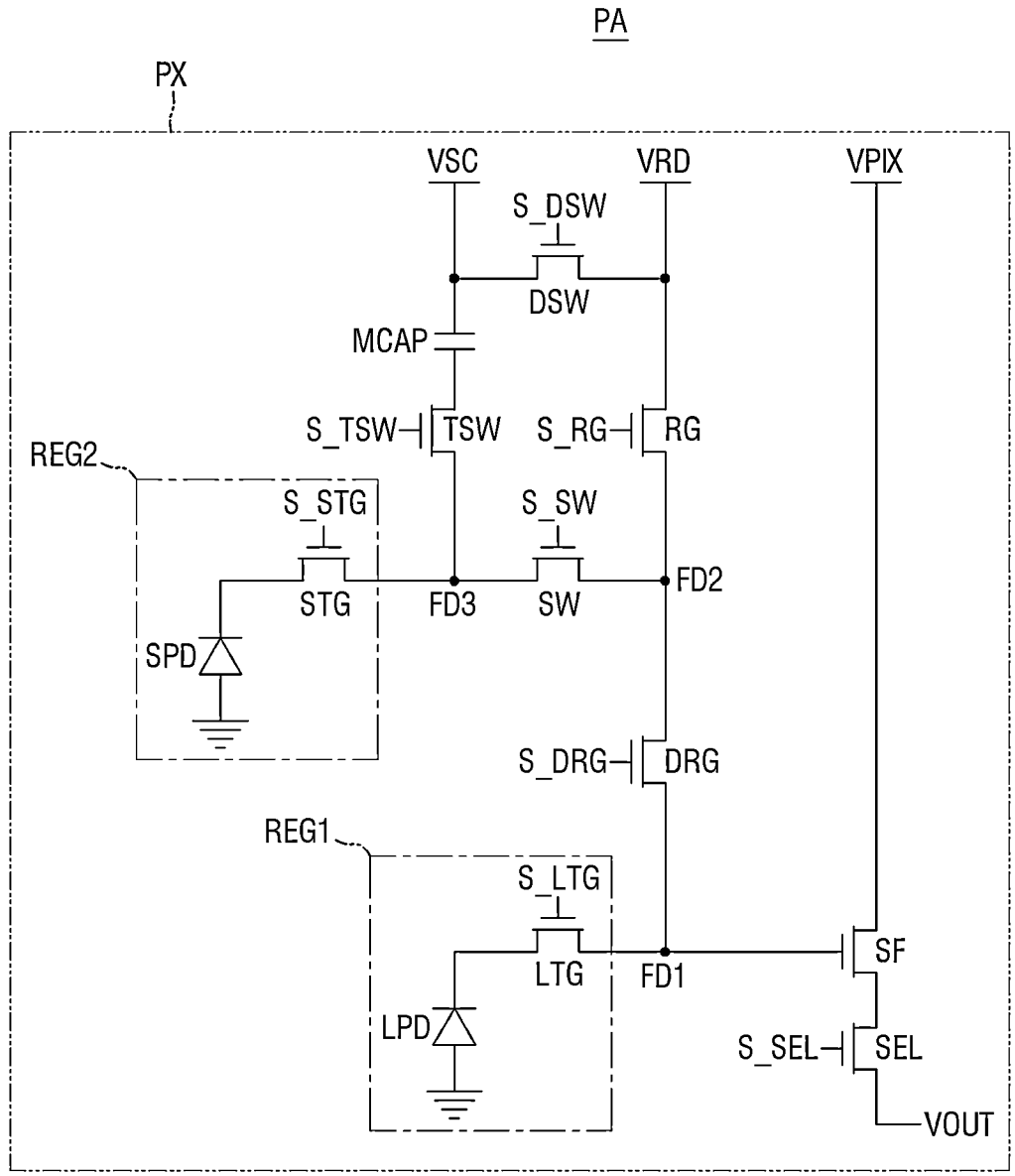
FIG. 3 is a circuit diagram of a unit pixel according to some example embodiments.

FIG. 3 is a circuit diagram of a unit pixel according to some example embodiments.

Referring to FIGS. 2 and 3, the unit pixel PX that forms (e.g., at least partially defines) the pixel array PA includes a pixel circuit (also referred to herein as a unit pixel circuit), as shown in FIG. 3, which may include a first photodiode LPD, a second photodiode SPD, a plurality of transistors and a capacitor MCAP. The plurality of transistors may include transfer transistors STG and LTG, a source follower transistor SF, a selection transistor SEL, a reset transistor RG, and a switching transistor DRG. The transfer transistor TG may include a first transfer transistor LTG and a second transfer transistor STG.

A first sub-pixel REG1 may include a first photodiode LPD and a first transfer transistor LTG, and a second sub-pixel REG2 may include a second photodiode SPD and a second transfer transistor STG. The first photodiode LPD may correspond to the first photoelectric conversion region (REG1 of FIG. 2), and the second photodiode SPD may correspond to the second photoelectric conversion region (REG2 of FIG. 2). The first photodiode LPD including the first photoelectric conversion region REG1 having a relatively large area in a plan view may be called a large photodiode, and the second photodiode SPD including the second photoelectric conversion region REG2 having a relatively small area may be called a small photodiode.

The first sub-pixel REG1 and the second sub-pixel REG2 may share one source follower transistor SF, one selection transistor SEL and one reset transistor RG.

More specifically, the first transfer transistor LTG is placed (e.g., located, electrically connected, etc.) between the first photodiode LPD and the first node FD1 (e.g., electrically connected between the first photodiode LPD and the first node FD1). The first node FD1 may be connected to the first floating diffusion region FD1 or the first node FD1 itself may be the first floating diffusion region FD1. A gate of the first transfer transistor LTG may be connected to the first transfer line to receive the first transfer signal S_LTG.

A source follower transistor SF is connected between a first power supply voltage line that provides a first power supply voltage VPIX and an output signal line VOUT. A gate of the source follower transistor SF is connected to a first node FD1 connected to the first floating diffusion region FD1.

The selection transistor SEL is placed between the source follower transistor SF and the output signal line VOUT. The gate of the selection transistor SEL may be connected to the selection line of the corresponding row to receive application of the selection signal S_SEL.

A first switching transistor DRG and a reset transistor RG are placed between the first node FD1 and a second power voltage line that provides the second power voltage VRD. A second node FD2 is defined between the first switching transistor DRG and the reset transistor RG. In some example embodiments, at least the second node FD2 may be defined as being included in the first region REG1.

The switching transistor DRG is placed between the first node FD1 and the second node FD2. The gate of the switching transistor DRG is connected to the connecting signal line. The switching transistor DRG may serve to connect the first node FD1 and the second node FD2 according to the switching control signal S_DRG provided from the connecting signal line.

The reset transistor RG is placed between the second power supply voltage line VRD and the second node FD2. A gate of the reset transistor RG may be connected to a reset line to receive a reset signal S_RG.

A second transfer transistor STG and a connecting transistor SW are placed (e.g., located, electrically connected, etc.) between the second photodiode SPD and the second node FD2 (e.g., electrically connected in series between the second photodiode SPD and the second node FD2). A third node FD3 is defined between the second transfer transistor STG and the connecting transistor SW. In some example embodiments, at least the third node FD3 may be defined as being included in the second region REG2.

The second transfer transistor STG is connected between the second photodiode SPD and the third node FD3. The third node FD3 may be connected to the second node FD2. A gate of the second transfer transistor STG may be connected to the second transfer line. A second transfer signal S_STG, which is a scan signal different from that of the first transfer line, is applied to the second transfer line, and the first transfer transistor LTG and the second transfer transistor STG may be turned on and off at different timings accordingly.

The connecting transistor SW is placed (e.g., located, electrically connected, etc.) between the third node FD3 and the second node FD2. The gate of the connecting transistor SW is connected to the switch control line. The connecting transistor SW may serve to connect the third node FD3 and the second node FD2 according to the connection control signal S_SW.

According to some example embodiments, a capacitor MCAP is placed (e.g., located, electrically connected, etc.) between the third node FD3 and the third power supply voltage line VSC. A capacitor connecting transistor TSW may be connected between the capacitor MCAP and the third node FD3. The capacitor connecting transistor TSW may or may not store the electric charges overflowing from the second photodiode SPD in the capacitor MCAP in accordance with the capacitor connecting signal S_TSW. In some example embodiments, according to some example embodiments, the capacitor MCAP may be placed (e.g., located, electrically connected, etc.) between the third node FD3 and the second power supply voltage line VRD.

According to some example embodiments, a unit pixel PX may further include a power supply connecting switch DSW that has a gate that may be electrically coupled to the control register block 1110, the timing generator 1120, or the like, and that may connect the second power supply voltage line VRD and the third power supply voltage line VSC in accordance with a connecting signal S_DSW.

Figure 4:
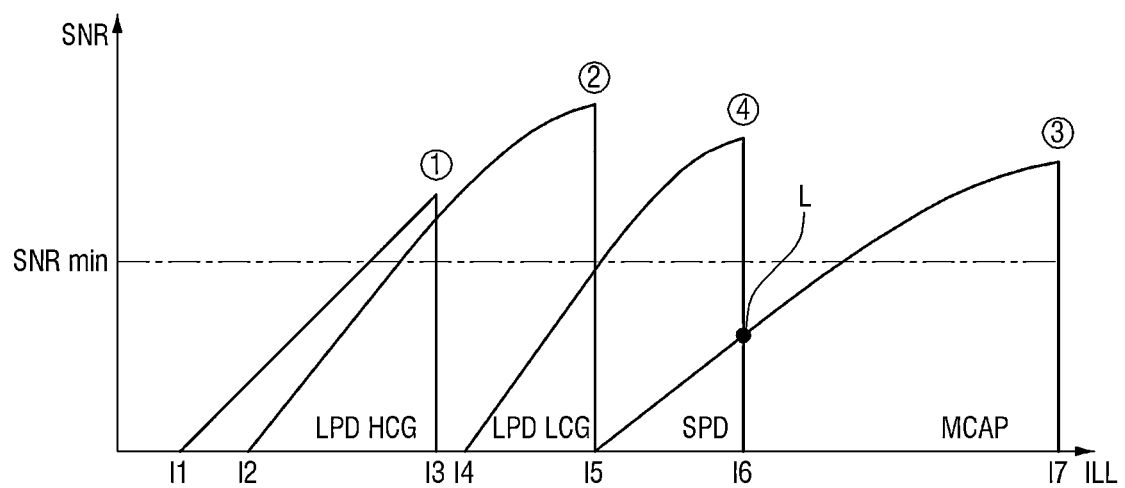
FIG. 4 is a graph showing a signal-to-noise ratio depending on illuminance when the pixel circuit of FIG. 3 operates.

FIG. 4 is a graph showing a signal-to-noise ratio depending on illuminance when the pixel circuit of FIG. 3 operates.

As shown in FIG. 4, the image sensor senses minimum illuminances I1, I2, I4, and I5 and maximum illuminances I3, I5, I6, and I7 during operation of the pixel PX (also referred to herein as a unit pixel PX). The minimum illuminances I1, I2, I4, and I5 and the maximum illuminances I3, I5, I6, and I7 are related to the dynamic range.

When the pixel circuit of FIG. 3 operates, there is a difference in the connected nodes between first to fourth operations (①to ④). Therefore, it (e.g., the pixel circuit) may have different minimum illuminances and maximum illuminances for each operation. That is, it (e.g., the pixel circuit) may have illuminances of different dynamic ranges for each detail operation.

For example, in a first operation ① of outputting the electric charges generated from the first photodiode LPD and transferred to the first node FD1, since the pixel PX has a relatively small capacitance, a first dynamic range (LPD HCG=I1 to I3) of the first operation ① has a dynamic range of low illuminance. Therefore, the first operation ① may be usefully utilized for image sensing in a low illuminance environment.

In a second operation ②, since the first node FD1 and the second node FD2 are connected, the pixel PX may have a larger capacitance than in the first operation. Therefore, the second dynamic range (LPD LCG=I2 to I5) of the second operation ② has a larger value than the first dynamic range (LPD HCG). The second dynamic range (LPD LCG) partially overlaps the first dynamic range (LPD HCG), and may have a maximum signal-to-noise value SNR greater than the first dynamic range (LPD HCG).

In a third operation 3, since not only the first node FD1 and the second node FD2 but also the third node FD3 to which the capacitor MCAP having large capacitance is connected are connected together, the pixel PX may have a larger full-well capacity. Therefore, the third operation 3 may have a larger third dynamic range (MCAP=I5 to I7) compared to the second dynamic range (LPD LCG). The third dynamic range MCAP may not overlap the second dynamic range (LPD LCG). That is, the minimum illuminance I5 of the third dynamic range MCAP may be equal to or greater than the maximum illuminance I5 of the second dynamic range (LPD LCG).

The third dynamic range MCAP implemented by the third operation ③ may be usefully utilized for image sensing of high illuminance environments. The maximum illuminance I7 of the third dynamic range MCAP may be greater than the maximum illuminance I5 of the second dynamic range (LPD LCG). The third dynamic range MCAP may have a maximum signal-to-noise value SNR greater than the second dynamic range (LPD LCG). In some example embodiments, the third dynamic range MCAP may have a maximum signal-to-noise value SNR smaller than the second dynamic range (LPD LCG). In some example embodiments, the third dynamic range MCAP may have a maximum illuminance that is greater than the second dynamic range (LPD LCG).

A fourth operation ④ is an operation of outputting the electric charges generated from the second photodiode SPD and transferred to the third node FD3. In the fourth operation ④, similar to the third operation ③, the first node FD1, the second node FD2 and the third node FD3 are connected together. However, since the fourth operation is performed after readout by the capacitor MCAP connected to the third node FD3 is completed and reset, it may have a fourth dynamic range SPD smaller than the third dynamic range MCAP. The fourth dynamic range SPD may be located between the second dynamic range (LPD LCG) and the third dynamic range MCAP. The minimum illuminance I4 of the fourth dynamic range SPD is smaller than the maximum illuminance I5 of the second dynamic range (LPD LCG) but may be greater than the maximum illuminance I3 of the first dynamic range (LPD HCG). The maximum illuminance I6 of the fourth dynamic range SPD may be greater than the minimum illuminance I5 of the third dynamic range MCAP and smaller than the maximum illuminance I7 of the third dynamic range MCAP. The maximum signal-to-noise value SNR of the fourth dynamic range SPD may be, but is not limited to, greater than the maximum signal-to-noise value SNR of the first dynamic range (LPD HCG) and smaller than the maximum signal-to-noise value SNR of the second dynamic range (LPD LCG). The maximum signal-to-noise value SNR of the fourth dynamic range SPD may be, but is not limited to, greater than the maximum signal-to-noise value SNR of the third dynamic range MCAP and smaller than the maximum signal-to-noise value SNR of the second dynamic range (LPD LCG).

In this way, when the pixel PX has the first photodiode LPD and the second photodiode SPD of different sizes from each other, it is possible to set the dynamic range DR of various ranges by diversifying the connection relationship of the nodes. Therefore, since the pixel PX may output a signal having a full dynamic range including the first to fourth dynamic ranges, the full well capacitance FDR of the image sensor may increase. In addition, as the plurality of dynamic ranges are set to overlap, since it is possible to obtain an output equal to or greater than the reference signal-to-noise ratio (SNRmin), which is the minimum standard required in a wide illuminance range, an image sensing quality can be improved.

At this time, transition points (or SNR dips) between the first to fourth dynamic ranges may need to satisfy a preset minimum SNR. The transition point is, for example, from the first dynamic range to the second dynamic range, and the transition point is an intersection point of the SNR graph at illuminance I3. In the case of the transition point at illuminance I3, an output equal to or greater than the minimum reference signal-to-noise ratio (SNRmin) may be obtained.

However, in a device equipped with an image sensor, when increasing an EIT (Effective Integration Time) for LFM (LED flicker mitigation), the resolution is enhanced, but a motion blur may occur when imaging (e.g., during image generation by the pixel PX). For example, in the case of a traffic light, in reality, an operation (LED flicker) of blinking and turning on and off is repeated several hundreds and thousands of times by the traffic light to emit light. If the EIT of a pixel PX generating an image of the traffic light is shorter than a reciprocal of the blinking period of the traffic light, there is a problem that the lighting of the traffic light cannot be imaged by the pixel PX. If the EIT is longer than a reciprocal of the blinking period of the traffic light, it is possible to catch lighting of the traffic light. However, when the EIT is lengthened, a motion blur may occur, while the device equipped with the image sensor moves at the time of the sensing time (integration time) of photodiode. Therefore, there is a need for an image sensor with improved LED flicker performance without exhibiting motion blur.

That is, if the EIT is lengthened to improve resolution, the fourth dynamic range that utilizes the second photodiode is the transition point at illuminance I5, but in the case of illuminance I6, an output below the minimum reference signal-to-noise (SNRmin) may be obtained.

Therefore, the EIT and readout time for the first photodiode LPD and second photodiode SPD may be adjusted appropriately to exceed the minimum reference signal-to-noise (SNR min) even when operating at any illuminance.

For example, when analog-binning is performed on the pixel values sensed by a plurality of pixels while lengthening the EIT time, since the binned values may have output equal to or greater than the reference signal-to-noise ratio (SNRmin), which is the minimum standard required in a wide illuminance range, no motion blur occurs and image sensing quality may be improved. A detailed operating method will be explained later.

Figure 5:
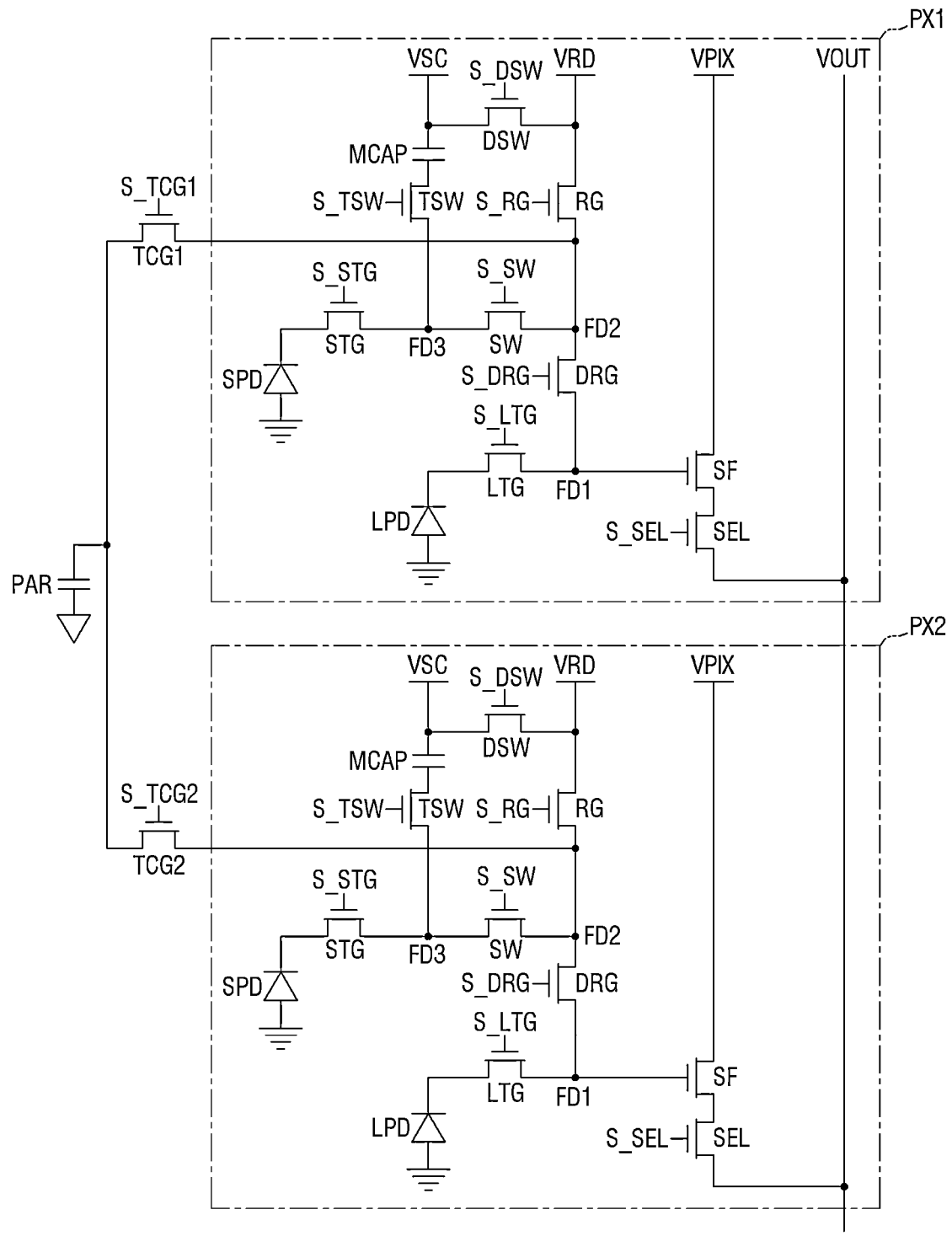
FIG. 5 is a diagram that shows a circuit diagram of unit-grouped pixels according to some example embodiments.

FIG. 5 is a diagram that shows a circuit diagram of unit-grouped pixels according to some example embodiments.

Referring to FIGS. 3 and 5, the unit grouping may be grouped into at least two unit pixels PX1 and PX2. In some example embodiments, including the example embodiments shown in at least FIG. 5, two unit pixels belonging to different rows of the pixel array PA and belonging to the same column of the pixel array PA may be grouped. However, the unit pixels grouped according to some example embodiments may be pixels made up of 2×2 array, may be pixels made up of 4×1 array, or may be an M×N array (M and N are natural numbers equal to or greater than 1). Each of the unit pixels PX1 and PX2 may have the same circuit as the unit pixel circuit described in FIG. 3.

The unit grouping pixel may be one in which the floating diffusion region FD of any one of the first unit pixel PX1 and/or the second unit pixel PX2 is electrically connected. As an example, the unit grouping pixel may be one in which the first floating diffusion regions FD1 of unit pixels adjacent to each other are electrically connected to each other and grouped. In some example embodiments, including the example embodiments shown in FIG. 5, the unit grouping pixel may be one in which the second floating diffusion regions FD2 of unit pixels adjacent to each other are electrically connected to each other and grouped. In some example embodiments, for example, the unit grouping pixel may be one in which the third floating diffusion regions FD3 of unit pixels adjacent to each other are electrically connected to each other and grouped.

The unit grouping pixel may be one in which the same color pixels are grouped together according to some example embodiments. If same color pixels are grouped together, they may be subjected to analog-binning by the FD connecting transistor TCG. In some example embodiments, the unit grouping pixel may be one in which other color pixels are also grouped together. In the case of grouping including different color pixels, all the FD connecting transistors TCG are turned on to perform analog-binning, but they may be set to a preset single color to output the analog-binning result value.

In some example embodiments, including the example embodiments shown in FIG. 5, floating diffusion region (FD) connecting transistors (hereinafter referred to as FD connecting transistors) TCG1 and TCG2 may be each connected between the second node FD2 of the first unit pixel PX1 and the second node FD2 of the second unit pixel PX2. That is, the first FD connecting transistor TCG1 has one end connected to the second node FD2 of the first unit pixel PX1, and the other end connected to the second FD connecting transistor TCG2. The second FD connecting transistor TCG2 has one end connected to the second node FD2 of the first unit pixel PX2, and the other end connected to the first FD connecting transistor TCG1.

The FD connecting transistors TCG1 and TCG2 are connected to any one of the first floating diffusion region FD1, the second floating diffusion region FD2, or the third floating diffusion region FD3 to enable the grouped binning operation. Accordingly, they (e.g., FD connecting transistors TCG1 and TCG2) may enable high, middle, and low triple conversion gain (Triple CG) in the first photodiode LPD or the second photodiode SPD.

For example, if the second floating diffusion regions FD2 of each of the plurality of pixels are connected through the FD connecting transistors TCG1 and TCG2, when the FD connecting transistors TCG1 and TCG2 are turned on simultaneously, since the electric charges accumulated in the second floating diffusion region FD2 of the first pixel PX1 and the second floating diffusion region FD2 of the second pixel PX2 are binned, a high triple conversion gain is enabled.

For example, if the first floating diffusion regions FD1 of each of the plurality of pixels are connected through the FD connecting transistors TCG1 and TCG2, when the FD connecting transistors TCG1 and TCG2 are turned on simultaneously, since the electric charges accumulated in the first floating diffusion region FD1 of the first pixel PX1 and the first floating diffusion region FD1 of the second pixel PX2 are binned, a middle triple conversion gain is enabled.

In some example embodiments, for example, if the third floating diffusion regions FD3 of each of the plurality of pixels are connected through the FD connecting transistors TCG1 and TCG2, when the FD connecting transistors TCG1 and TCG2 are turned on simultaneously, since the electric charges accumulated in the third floating diffusion region FD3 of the first pixel PX1 and the third floating diffusion region FD3 of the second pixel PX2 are binned, a low triple conversion gain is enabled.

Figure 6:
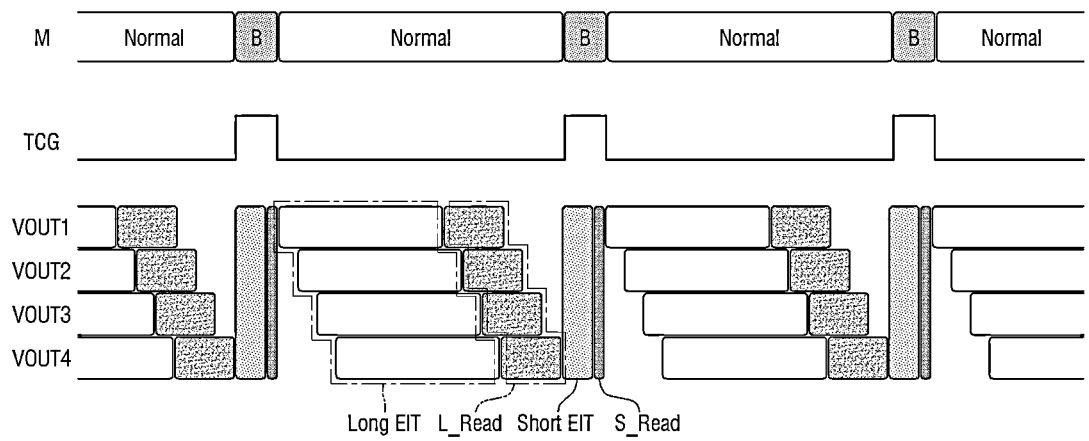
FIG. 6 is a timing diagram for explaining operation of unit grouping pixels according to some example embodiments.

FIG. 6 is a timing diagram for explaining operation of unit grouping pixels according to some example embodiments.

The operation of the unit pixel PX will be described referring to FIG. 6. The pixel array periodically and alternately operates between a normal operation and a binning operation. That is, when the normal operation ends, the binning operation is performed, and when the binning operation ends, the normal operation is performed. The normal operation means an operation in which the FD connecting transistor TCG is turned off and the operation is performed, and the binning operation means an operation in which the FD connecting transistor TCG is turned on and the operation is performed.

The unit operation of the unit pixel PX includes an EIT (Effective Integration Time) section in which the electric charges generated by photoelectric conversion in each photodiode (LPD, SPD) are accumulated, and a read-out section in which the electric charges generated in the EIT period are read at an output voltage. As shown in FIG. 6, in the unit operation, a normal operation section includes a long EIT (Long EIT) section and a long readout L_Read section, and a binning operation section includes a short EIT (Short EIT) section and a short readout (S_Read) section.

That is, since the unit pixels PX individually convert the electric charges to generate signals at the time of the normal operation of the unit pixels, a long EIT section (Long EIT) and a long read time L_Read are required for each unit pixel.

On the other hand, at the time of the binning operation, since the electric charges accumulated in the floating diffusion regions connected to each other by grouping the unit pixels PX are read out at the same time, a short EIT section (Short EIT) and a short read time (S_Read) may be required. Since the FD connecting transistors of the plurality of grouped unit pixels are turned on to accumulate and read out the electric charges simultaneously, the unit operating time (Short EIT+S_Read) of the binning operation is shorter than the unit operating time of normal operation (Long EIT+L_Read).

Figure 7:
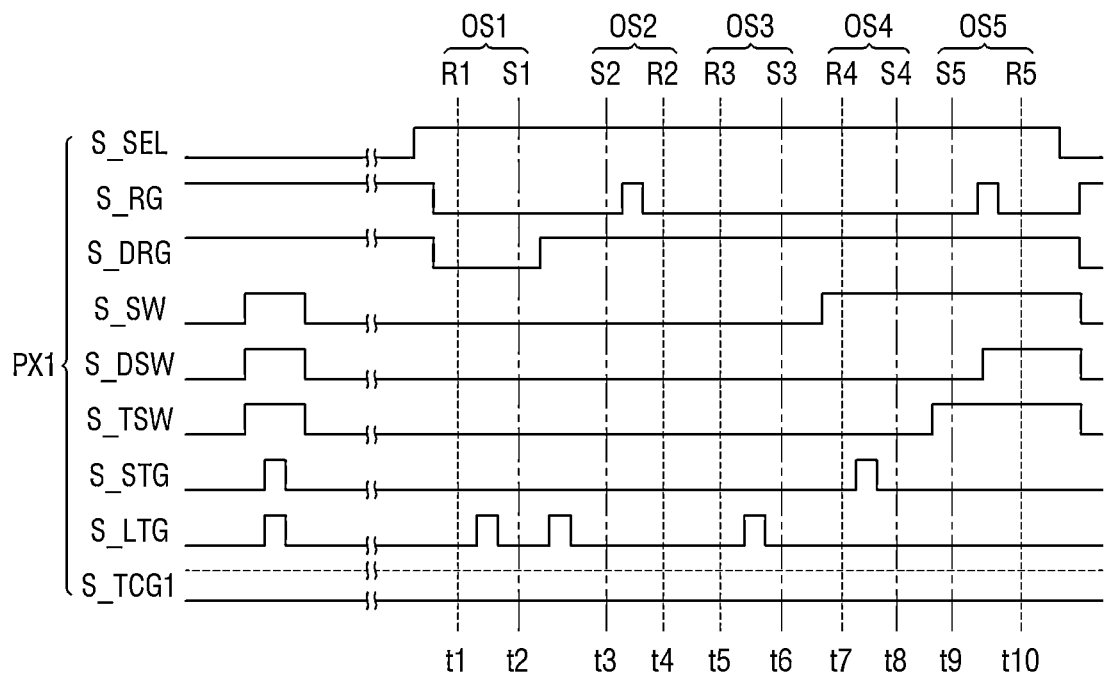
FIG. 7 is a timing diagram for explaining the normal operation of a unit pixel according to some example embodiments.
Figure 8:
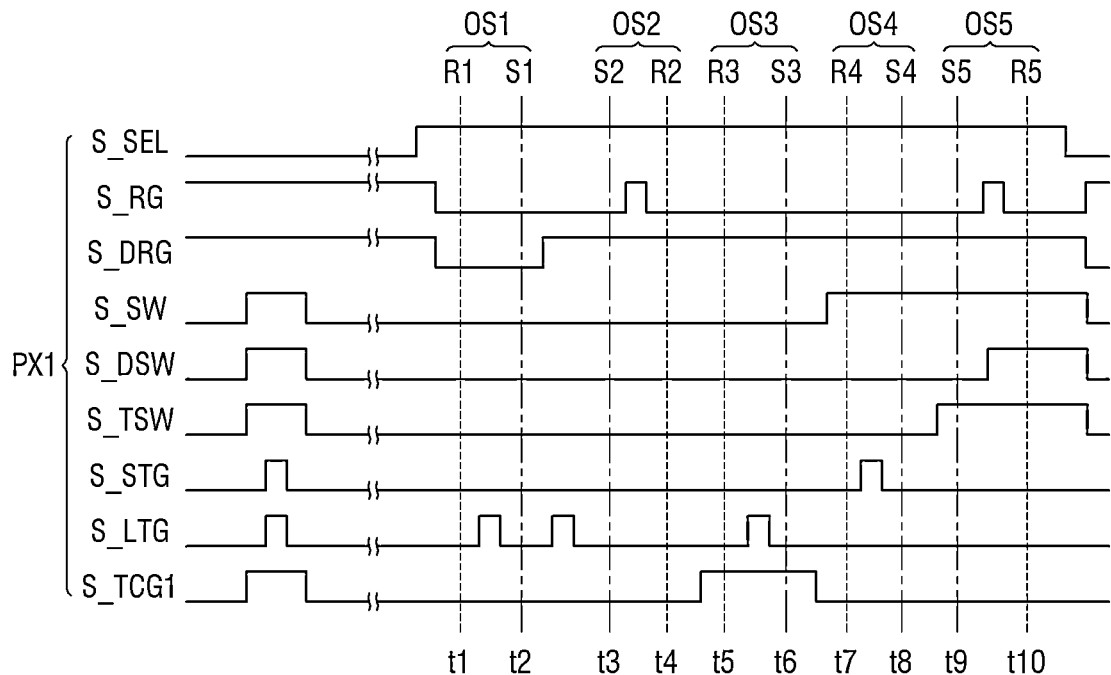
FIG. 8 is a timing diagram for explaining the normal operation according to some example embodiments.

FIG. 7 is a timing diagram for explaining the normal operation of a unit pixel according to some example embodiments, and FIG. 8 is a timing diagram for explaining the normal operation according to some example embodiments.

Referring to FIG. 7, the normal operation of one activated unit pixel (e.g., PX1) will be specifically described. Signals different from the shown example may be applied to the pixels PX2 corresponding to other rows that are not selected as the read-out target at the same timing. For example, signal waveforms appearing before or after the five operations (OS1, OS2, OS3, OS4, and OS5) of FIG. 7 may be applied to the pixels PX corresponding to other rows that are not selected as read-out target.

The timing chart of FIG. 7 shows the waveforms of the selection signal S_SEL, the reset signal S_RG, the switching control signal S_DRG, the connection control signal S_SW, the connecting signal S_DSW, the capacitor connecting signal S_TSW, the second transfer signal S_STG, the first transfer signal S_LTG, and the FD connecting signal S_TCG1 in order. Each signal waveform swings between a voltage of high level and a voltage of low level. In some example embodiments, including the example embodiments shown in FIGS. 7 and 8, a voltage of high level is explained as a turn-on signal that turns on the applied transistor, and a voltage of low level is explained as a turn-off signal that turns off the applied transistor. However, in contrast, in some example embodiments the signal may be turned off when the voltage is a voltage of high level, and the signal may be turned on when the voltage is a voltage of low level according to some example embodiments.

Referring to FIG. 7, readout of pixel PX1 may include five operations according to some example embodiments. Specifically, the readout of the pixel PX1 may include a first operation OS1, a second operation OS2, a third operation OS3, a fourth operation OS4, and a fifth operation OS5 that progress sequentially in chronological order. Each operation includes a separate signal operation S1, S2, S3, S4, and S5, and each operation may further include a separate reset operation R1, R2, R3, R4, and R5. Within one operation, the reset operation may be performed before or after the signal operation. The reset operation may be omitted within some operations. The selection signal S_SEL maintains a high level at the time of the five operations.

At the time of the time before the readout L_Read, in other words, at the time of the time before the first operation OS1, the selection signal S_SEL, the first transfer signal S_LTG and the second transfer signal S_STG maintain a low level, and the reset signal S_RG and the switching control signal S_DRG maintain a high level.

In the first operation OS1, a first reset operation R1 is first performed at a first time t1, and then a first signal operation S1 may be performed at a second time t2.

Specifically, the selection signal S_SEL is switched from the low level to the high level, and the reset signal S_RG and the switching control signal S_DRG switch from the high level to the low level, until the first time t1 at which the first reset operation R1 is performed. The electric charges accumulated at the first node FD1 during the first reset operation R1 may be converted into the first reset voltage VR1 through the source follower transistor SF and output.

Subsequently, the first signal operation S1 may be performed at the second time t2. During the time interval between the first time t1 and the second time t2, the first transfer signal S_LTG may be switched from the low level to the high level and then switched to low level again. While the first transfer signal S_LTG maintains a high level, the first transfer transistor LTG may be turned on and then turned off for a particular (or, alternatively, predetermined) period of time. The first node FD1 may be connected to the first photodiode LPD during the time at which the first transfer transistor LTG is turned on. Accordingly, the electric charges accumulated in the first photodiode LPD may be transferred to the first node FD1 (that is, the first floating diffusion region FD1). The electric charges transferred to the first node FD1 may be converted into the first signal voltage VS1 by the source follower transistor SF and output.

The second operation OS2 is performed subsequent to the first operation OS1. In the second operation OS2, after performing the second signal operation S2 at the third time t3, the second reset operation R2 may be performed at the fourth time t4.

Specifically, during the time interval between the second time t2 and the third time t3, the switching control signal S_DRG is switched from the low level to the high level to turn on the switching transistor DRG. As a result, the first node FD1 and the second node FD2 may be connected.

Also, during the time interval between the second time t2 and the third time t3, the first transfer signal S_LTG is switched from the low level to the high level with the switching transistor DRG turned on, and then may be switched to the low level again. The first node FD1 may be connected to the first photodiode LPD and the second node FD2 during the time at which the switching transistor DRG and the first transfer transistor LTG are turned on at the same time. Therefore, the electric charges accumulated in the first photodiode LPD and the electric charges transferred to the first node FD1 during the aforementioned time may be shared by the first node FD1 and the second node FD2. After that, the voltage of the first node FD1 formed by the shared electric charges may be converted into the second signal voltage VS2 by the source follower transistor SF and output.

Subsequently, the second reset operation R2 may be performed at a fourth time t4. Between the third time t3 and the fourth time t4, the reset signal S_RG is switched from the low level to the high level and then may be switched to low level again. While the reset signal S_RG maintains a high level, the reset transistor RG is turned on, and the electric charges of the first node FD1 and the second node FD2 may be reset. The reset electric charges of the first node FD1 and the second node FD2 may be converted into the second reset voltage VS2 by the source follower transistor SF and output.

The third operation OS3 is performed subsequent to the second operation OS2. In the third operation OS3, after the third reset state R3 is maintained at the fifth time t5 subsequent to the fourth time t4, the third signal operation S3 may be performed at the sixth time t6.

Referring to FIG. 7, in the normal operation according to some example embodiments, the FD connecting transistor TCG1 may still maintain the turned-off state. That is, only unit pixels activated without being electrically connected to other adjacent unit pixels are activated, and the third reset state and the third signal operation may be performed.

In the third operation OS3, during the time interval between the fifth time t5 and the sixth time t6, the switching transistor DRG is turned on and the first transfer signal S_LTG is switched from the low level to the high level and then switched to the low level again, and the third signal operation S3 may be performed. During the time at which the first transfer transistor LTG of the first unit pixel PX1 is turned on, the accumulated electric charges of the first photodiode LPD are accumulated in the first node FD1 and the second node FD2, and may be converted into the third signal voltage VS3 by the source follower transistors $SF_{PX1}$ and $SF_{PX2}$ and output.

Referring to FIG. 8, in the normal operation according to some example embodiments, the FD connecting transistor TCG1 is switched from the low level to the high level between the fourth time t4 and the fifth time t5. In the third operation OS3, the switching transistor DRG is turned on and the FD connecting transistor TCG1 is turned on during the time interval between the fifth time t5 and the sixth time t6. During the time interval between the fifth time t5 and the sixth time t6, the first transfer signal S_LTG is switched from the low level to the high level and then to low level again, and the third signal operation S3 may be performed. However, in the normal operation, the FD connecting transistor TCG2 of the adjacent unit pixel (e.g., PX2) is turned off, and only the FD connecting transistor TCG1 of the currently enabled unit pixel is turned on.

That is, the accumulated electric charges of the first photodiode LPD during the time at which the first transfer transistor LTG of the first unit pixel PX1 is turned on utilize not only the first node FD1 and the second node FD2, but also the parasitic capacitor PAR of the connecting transistor wiring due to turning-on of the connecting transistor TCG1, more electric charges may be accumulated without overflow.

Electric charges accumulated in the first node FD1, the second node FD2, and the parasitic capacitor PAR of the first unit pixel PX1 may be converted into a third signal voltage VS3 by the source follower transistors $SF_{PX1}$ and $SF_{PX2}$ and output.

Referring to FIG. 7 and/or FIG. 8 again, in the fourth operation OS4, the fourth signal operation S4 may be performed at the eighth time t8 after the fourth reset operation R4 is first performed at the seventh time t7. Specifically, the fourth reset operation R4 may be performed at the seventh time t7. Between the sixth time t6 and the seventh time t7, the FD connecting transistor TCG1 is turned off, the connecting signal SW is switched from the low level to the high level, the connecting transistor SW is turned on, and the second node FD2 and the third node FD3 are connected.

Then, during the time interval between the seventh time t7 and the eighth time t8, the second transfer signal S_STG connected to the second photodiode SPD may be switched from the low level to the high level and then switched to low level again. While the second transfer signal S_STG maintains a high level, the second transfer transistor STG may be turned on for a particular (or, alternatively, predetermined) time and then turned off. The third node FD3 may be connected to the second photodiode SPD during the time at which the second transfer transistor STG is turned on. In addition, the switch transistor SW also maintains the turned-on state after the seventh time t7, and the electric charges generated in the second photodiode SPD and accumulated at the third node FD3 (that is, the third floating diffusion region FD3) are shared by the second node FD2 through the turned-on connecting transistor SW. Since the switching transistor DRG is continuously turned on at the seventh time t7 and the eighth time t8, the electric charges of the second node FD2 are also shared by the first node FD1. That is, the electric charges shared by the first node FD1, the second node FD2, and the third node FD3 may be converted into a fourth signal voltage VS4 and output through the source follower transistor SF.

The fourth signal voltage VS4 may not include the output for the electric charges accumulated in the capacitor MCAP with the capacitor connecting transistor TSW turned off.

A fifth operation OS5 is performed subsequent to the fourth operation OS4. In the fifth operation OS5, the fifth signal operation S5 is first performed at the ninth time t9, and then the fifth reset operation R5 may be performed at the tenth time t10.

During the time interval between eighth time t8 and ninth time t9, the capacitor connecting signal S_TSW may be switched from the low level to the high level. Therefore, the capacitor MCAP is connected to the third node FD3, and the electric charges overflowing and accumulated in the capacitor MCAP are shared with the third node FD3. When the connecting transistor SW is turned on and the switching transistor DRG is turned on, the first node FD1, the second node FD2 and the third node FD3 are all connected, and the electric charges generated through the second photodiode SPD and accumulated in the capacitor MCAP may be converted into a fifth signal voltage VS5 and output by the source follower transistor SF.

Subsequently, a fifth reset operation R5 is performed at a tenth time t10. During the time interval between the ninth time t9 and the tenth time t10, the reset signal S_RG is switched from the low level to the high level, switched to low level again, and the connecting signal S_DSW is switched from the low level to the high level. While the reset signal S_RG is at a high level, the reset transistor RG is turned on, the first node FD1, the second node FD2, and the third node FD3 are reset on the basis of the second power voltage VRD, and the residual electric charges of the capacitor MCAP are also reset according to the connecting signal S_DSW.

After the fifth operation OS5, the selection signal S_SEL and the switch control signal S_DRG are switched from the high level to the low level, and the reset signal S_RG may be switched from the low level to the high level.

In summary, the first operation OS1 is an operation of transferring the electric charges generated by the first photodiode to the first floating diffusion region FD1 and outputting it (e.g., the electric charges transferred to the first floating diffusion region FD1) as the first output signal, the second operation OS2 is an operation of turning on the reset transistor RG to reset residual electric charges accumulated in the first floating diffusion region FD1 and the second floating diffusion region FD2 and outputting a second output signal, and the third operation is an operation of accumulating the electric charges generated by the first photodiode LPD at the first node FD1 and the second node FD2 and then outputting it as a third output signal (FIG. 7), or accumulating the electric charges at the first node FD1, the first node FD1, the second node FD2 and the parasitic capacitor PAR and outputting it as the third output signal (FIG. 8).

The fourth operation OS4 is an operation of transferring the electric charges generated by the second photodiode SPD to the third floating diffusion region and the capacitor MCAP through the second transfer transistor STG, and outputting it as a fourth output signal. The fifth operation OS5 is an operation of resetting residual electric charges of the first floating diffusion region, the second floating diffusion region, the third floating diffusion region, and the capacitor to outputting a fifth output signal when the first to fourth operations are completed.

Figure 9:
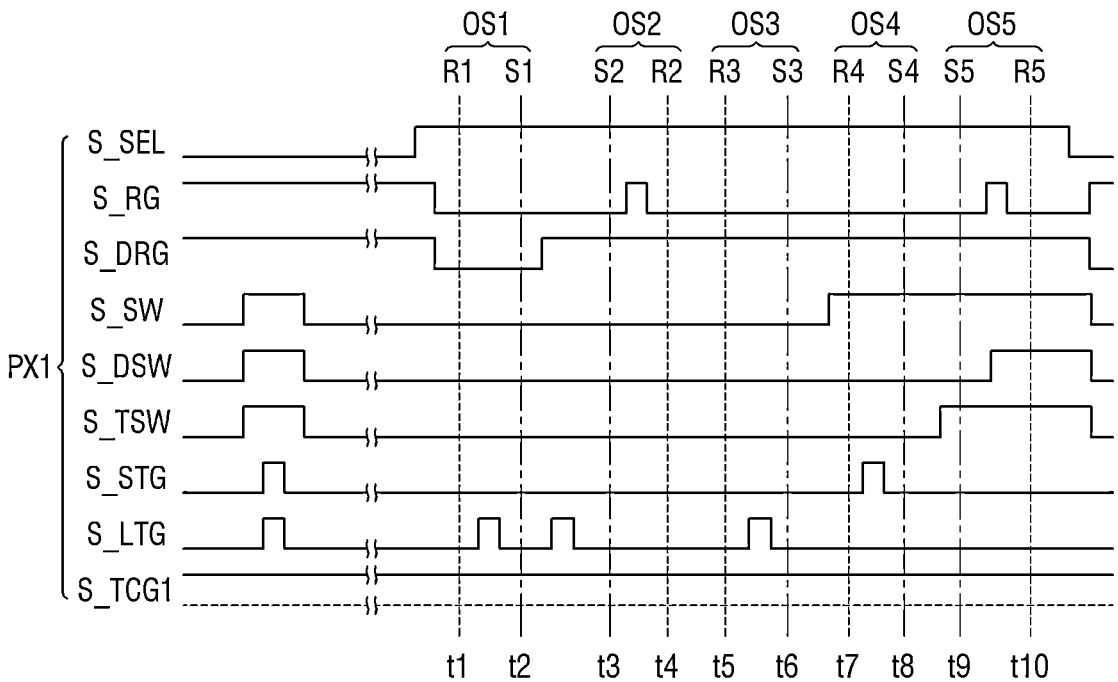
FIG. 9 is a timing diagram for explaining a unit pixel binning operation according to some example embodiments.

FIG. 9 is a timing diagram for explaining a unit pixel binning operation according to some example embodiments.

Referring to FIG. 9, unlike FIGS. 7 and 8, the FD connecting transistors (e.g., TCG1, TCG2) connected to the grouped unit pixels (e.g., PX1, PX2) are continuously maintained in the turned-on state at the time of the binning operation. The operation will be explained specifically. The selection signal S_SEL, the first transfer signal S_LTG, and the second transfer signal S_STG maintain a low level, and the reset signal S_RG and the switching control signal S_DRG maintain a high level, during the time before the readout L_Read, in other words, during the time before the first operation OS1.

In the first operation OS1, the first reset operation R1 is first performed at the first time t1, and then the first signal operation S1 may be performed at the second time t2.

Specifically, the selection signal S_SEL is switched from the low level to the high level, and the reset signal S_RG and the switching control signal S_DRG is switched from the high level to the low level, until the first time t1 at which the first reset operation R1 is performed. The electric charges accumulated in the parasitic capacitor PAR connected to the FD connecting transistor TCG1 and the FD connecting transistor TCG2, the first node FD1_PX1 of the first unit pixel, and the first node FD1_PX2 of the second unit pixel at the time of the first reset operation R1 may be converted into the first reset voltage VR1 through the source follower transistor SF and output.

Subsequently, the first signal operation S1 may be performed at the second time t2. During the time interval between the first time t1 and the second time t2, the first transfer signal S_LTG of the first and second unit pixels PX1 and PX2 may be switched from the low level to the high level and then switched to low level again. While the first transfer signal S_LTG maintains a high level, the first transfer transistors LTG_PX1 and LTG_PX2 of the first and second unit pixels may be turned on and then turned off for a particular (or, alternatively, predetermined) time. During the time at which the first transfer transistors LTG_PX1 and LTG_PX2 are turned on, the first nodes FD1_PX1 and FD1_PX2 of the first and second unit pixels PX1 and PX2 may be connected to the first photodiode LPD. Accordingly, the electric charges accumulated at each first photodiode LPD of the first and second unit pixels PX1 and PX2 may be transferred to the first nodes FD1_PX1 and FD1_PX2 of the first and second unit pixels PX1 and PX2 (that is, the first floating diffusion region). The electric charges transferred to the first nodes FD1_PX1 and FD1_PX2 of the first and second unit pixels PX1 and PX2 are converted into a first signal voltage VS1 by the source follower transistors SF_PX1 and SF_PX2, and may be output by being subjected to analog-binning on the output signal line.

After the first operation OS1, the second operation OS2 is performed. In the second operation OS2, the second reset operation R2 may be performed at the fourth time t4 after performing the second signal operation S2 at the third time t3.

Specifically, during the time interval between the second time t2 and the third time t3, the switching control signal S_DRG is switched from the low level to the high level to turn on the respective switching transistors DRG_PX1 and DRG_PX2 of the first and second unit pixels PX1 and PX2. As a result, the first node FD1 and the second node FD2 may be connected.

In addition, during the time interval between the second time t2 and the third time t3, the first transfer signal S_LTG is switched from the low level to the high level with the switching transistors DRG_PX1 and DRG_PX2 turned on, and then may be switched to the low level again. During the time at which the switching transistor DRG and the first transfer transistor LTG of the first and second unit pixels PX1 and PX2 are turned on simultaneously, the first node FD1 may be connected to the first photodiode LPD and the second node FD2. That is, by the FD connecting transistors TCG1 and TCG2 that are turned on, not only the first node FD1_PX1, the first photodiode LPD_PX1, and the second node FD2_PX1 electrically connected in the first unit pixel, but also the first node FD1_PX2, the first photodiode LPD_PX2, the second node FD2_PX2, and the parasitic capacitor PAR of the second unit pixel are electrically connected to accumulate the electric charges generated in the first photodiodes LPD_PX1 and LPD_PX2.

After that, the source follower transistor SF may be converted into the second signal voltage VS2 and output, on the basis of the electric charges accumulated and shared in the first node FD1_PX1, the first photodiode LPD_PX1, the second node FD2_PX1, the parasitic capacitor PAR, the first node FD1_PX2, the first photodiode LPD_PX2, and the second node FD2_PX2.

Subsequently, the second reset operation R2 may be performed at the fourth time t4. Between the third time t3 and the fourth time t4, the reset signal S_RG may be switched from the low level to the high level and then switched to low level again. When the reset transistor RG is turned on while the reset signal S_RG maintains at a high level with the FD connecting transistors TCG1 and TCG2 turned on, the residual electric charges of the first and second nodes FD1 and FD2 of the first and second unit pixels and the parasitic capacitor PAR may be reset. The electric charges of the first node FD1 and the second node FD2 of the reset unit pixels PX1 and PX2 may be converted into the second reset voltage VS2 by the source follower transistor SF and output.

The third operation OS3 is performed subsequent to the second operation OS2. In the third operation OS3, after the third reset state R3 is maintained at the fifth time t5 subsequent to the fourth time t4, the third signal operation S3 may be performed at the sixth time t6.

In the third operation OS3, during the time interval between the fifth time t5 and the sixth time t6, the switching transistor DRG is turned on, the first transfer signal S_LTG is switched from the low level to the high level, then switched to the low level again, and the third signal operation S3 may be performed. During the time at which the first transfer transistors LTG of the first and second unit pixels PX1 and PX2 are turned on, the accumulated electric charges of the first photodiodes LPD_PX1 and LPD_PX2 may be accumulated at the first node FD1, the second node FD2 and the parasitic capacitor PAR of each unit pixel, converted into the third signal voltage VS3 by the source follower transistors $SF_{PX1}$ and $SF_{PX2}$, and output.

In the fourth operation OS4, the fourth reset operation R4 is first performed at the seventh time t7, and then the fourth signal operation S4 may be performed at the eighth time t8. When the connecting signal SW is switched from the low level to the high level between the sixth time t6 and the seventh time t7 with the FD connecting transistor TCG1 turned on, the connecting transistor SW is turned on, and the second node FD2 and the third node FD3 of each of the first and second unit pixels PX1 and PX2 are electrically connected through the parasitic capacitor PAR.

Subsequently, during the time interval between the seventh time t7 and the eighth time t8, while the second transfer signal S_STG connected to the second photodiodes SPD of each of the first and second unit pixels PX1 and PX2 maintains a high level, the second transfer transistor STG is turned on, and the third node FD3 may be connected to the second photodiodes SPD_PX1 and SPD_PX2 of each of the first and second unit pixels PX1 and PX2. In addition, the switch transistor SW also maintains the turned-on state after the seventh time t7, and the electric charges generated in the second photodiode SPD and accumulated at the third nodes FD3_PX1 and FD3_PX2 (that is, the third floating diffusion region FD3) are shared with the second nodes FD2_PX1 and FD2_PX2 through the turned-on connecting transistor SW. Since the switching transistors DRG_PX1 and DRG_PX2 are continuously turned on at the seventh time t7 and the eighth time t8, the electric charges of the second node FD2 are also shared with the first node FD1. That is, the electric charges shared by the first nodes FD1_PX1 and FD1_PX2, the second nodes FD2_PX1 and FD2_PX2, the third nodes FD3_PX1 and FD3_PX2, and the parasitic capacitor PAR of the first and second unit pixels PX1 and PX2 may be converted into a fourth signal voltage VS4 through the source follower transistor SF and output.

The fourth signal voltage VS4 may not include the output for the electric charges accumulated in the capacitor MCAP with the capacitor connecting transistor TSW turned off.

A fifth operation OS5 is performed subsequent to the fourth operation OS4. In the fifth operation OS5, the fifth signal operation S5 is first performed at the ninth time t9, and then the fifth reset operation R5 may be performed at the tenth time t10.

During the time interval between the eighth time t8 and the ninth time t9, the capacitor connecting signal S_TSW of the first and second unit pixels PX1 and PX2 may be switched from the low level to the high level. Accordingly, the capacitor MCAP is connected to the third node FD3, and the electric charges overflowing and accumulated in the capacitors MCAP_PX1 and MCAP_PX2 are shared with each of third nodes FD3_PX1 and FD3_PX2. When the FD connecting transistors TCG1 and TCG2, the connecting transistors SW_PX1 and SW_PX2, and the switching transistors DRG_PX1 and DRG_PX2 are turned on, the first node FD1, the second node FD2, and the third node FD3 of the first and second unit pixels are all electrically connected, and the electric charges generated through the second photodiodes SPD of the first and second unit pixels and accumulated in each of the capacitors MCAP_PX1 and MCAP_PX2 may be converted into a fifth signal voltage VS5 by the source follower transistors SF_PX1 and SF_PX2, and output.

Subsequently, a fifth reset operation R5 is performed at the tenth time t10. During the time interval between the ninth time t9 and the tenth time t10, the reset signal S_RG is switched from the low level to the high level, then switched to low level again, and the connecting signal S_DSW is switched from the low level to the high level. While the reset signal S_RG is at a high level, the reset transistor RG is turned on, the first node FD1, the second node FD2, and the third node FD3 of the first and second unit pixels are turned on, on the basis of the second power supply voltage VRD, and the residual electric charges of the capacitor MCAP are also reset according to the connecting signal S_DSW.

After the fifth operation OS5, the selection signal S_SEL and the switch control signal S_DRG are switched from the high level to the low level, and the reset signal S_RG may be switched from the low level to the high level.

In the binning operation, unlike the normal operation, the first to fifth signal voltages output to the output signal lines are output by (e.g., based on) being subjected to analog-binning. Therefore, in a state in which the FD connecting transistor TCG which connects the unit pixels is turned off as in some example embodiments, including the example embodiments of FIG. 6, 7 or 8, the time at which the FD connecting transistor TCG is turned on for each group to generate the output signal of each unit pixel and read out it as an analog-binned signal may be relatively shorter than the time at which the output signal of each unit pixel is generated and read out. Further, while the FD connecting transistor TCG is turned on for the binning operation, the electric charges generated in the first photodiode LPD or the second photodiode SPD may be accumulated without overflowing and converted into an output signal.

Figure 10:
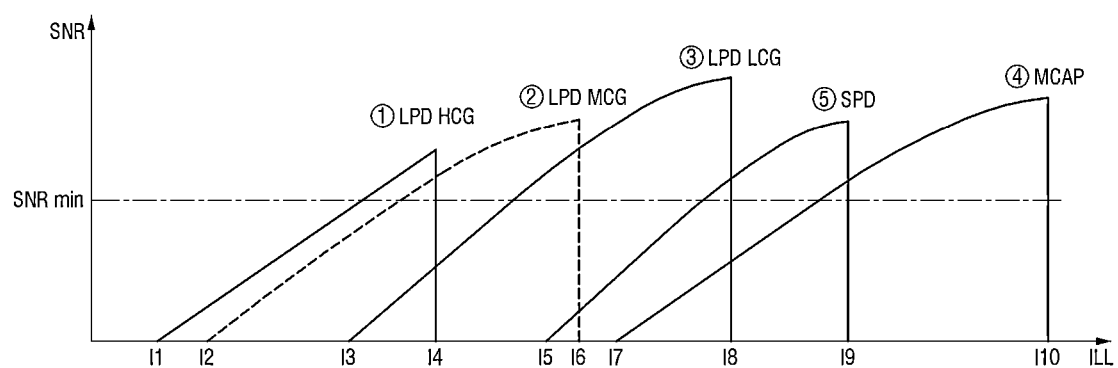
FIG. 10 is a graph showing signal-to-noise ratio depending on illuminance when operating unit-grouped pixel arrays according to some example embodiments.
Figure 11:
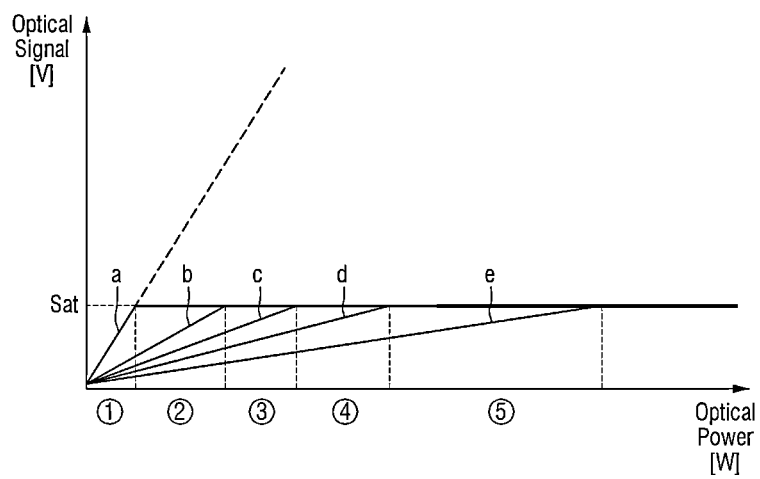
FIG. 11 is a graph showing an optical signal in comparison to an optical power, when the pixel array subjected to unit grouping according to some example embodiments.

FIG. 10 is a graph showing signal-to-noise ratio depending on illuminance when operating unit-grouped pixel arrays according to some example embodiments, and FIG. 11 is a graph showing an optical signal in comparison to an optical power, when the pixel array is subjected to unit grouping according to some example embodiments.

From the viewpoint of operating time, the operating time of the binning operation is only shorter than that of the normal operation, but the SNR depending on the illuminance may be expressed as shown in FIG. 10 for both the normal operation and the binning operation.

Specifically, in the first dynamic range ($\hat{1}$, LPD HCG), the electric charges generated from the first photodiode LPD and transferred to the first node FD1 are output in the image sensing operation in a low illuminance environment.

In the third dynamic range ($\hat{3}$, LPD LCG), since the accumulated electric charges are read out by connecting the first node FD1 and the second node FD2, it (the third dynamic range) has a value larger than the first dynamic range I1 to I4 ((I1-I4)<(I3-I8)). The first dynamic range and the third dynamic range correspond to the first operation OS1 and second operation OS2 of FIG. 6.

At this time, in the second dynamic range ($\hat{2}$, LPD MCG), although it has a low illuminance, when the FD connecting transistor of the unit pixel enabled as in FIG. 8 (e.g., TCG1) is turned on, the electric charges may be further accumulated by the parasitic capacitance PAR, and the accumulated electric charges are read out, it has a further improved SNR value. The second dynamic range may correspond to the second operation OS2 and the third operation OS3.

The fourth dynamic range ($\hat{4}$, SPD) senses only the electric charges generated from the second photodiode SPD and transferred to the third node FD3. The second photodiode SPD is utilized for image sensing in a high illuminance environment compared to the first photodiode LPD. Since the first node FD1, the second node FD2, and the third node FD3 to which the capacitor MCAP having large capacitance is connected are connected together in the fifth dynamic range ($\hat{5}$, MCAP), it may have a maximum dynamic range (I7-I10). The fourth dynamic range and the fifth dynamic range may correspond to the fourth operation OS4 and the fifth operation OS5.

Referring to FIG. 11, by reading the first to third floating diffusion regions with the first to fifth operations using a first photodiode and a second photodiode having different sensing sensitivities, it is possible to have a constant saturation signal value in the illuminance from low illuminance to high illuminance, that is, in the entire optical power region. That is, since the optical signal embodies any one of a b-graph, a c-graph, and a d-graph through the third operation OS3, a constant optical signal may be uniformly obtained in comparison with the optical power.

As shown in at least FIGS. 10-11, a pixel array PA including at least two unit pixels having first and second regions REG1 and REG2 as described herein and a floating diffusion (FD) connecting transistor TCG connected to any one of the first, second, or third nodes FD1, FD2, or FD3 (e.g., as shown in any of FIGS. 5, 12, 13, 14, 15, 16, 17, 18, 19, 20, and/or 21) may be driven to alternately perform a normal operation of individually operating the unit pixels, and a binning operation of grouping at least two unit pixels and operating them the at least two unit pixels simultaneously. Such operation may result in mitigating, reducing, minimizing, or preventing both LED flicker and motion blur, thereby providing improved LED flicker performance with reduced, minimized, or prevented exhibition of motion blur in images generated by the image sensor. For example, the EIT and readout time for the first photodiode LPD and second photodiode SPD may be adjusted appropriately to exceed the minimum reference signal-to-noise (SNR min) even when operating at any illuminance. For example, when analog-binning is performed on the pixel values sensed by a plurality of pixels while lengthening the EIT time, since the binned values may have output equal to or greater than the reference signal-to-noise ratio (SNRmin), which is the minimum standard required in a wide illuminance range, no motion blur occurs and image sensing quality may be improved. For example, as shown in at least FIG. 10, the transition points between dynamic ranges in such a pixel array PA (e.g., at illuminances I4, I6, I8, and I9 as shown) may be equal to or greater than the minimum reference signal-to-noise (SNRmin), thereby minimizing or preventing motion blur in the images generated by the image sensor including the pixel array PA including at least two unit pixels having first and second regions REG1 and REG2 as described herein and a floating diffusion (FD) connecting transistor TCG connected to any one of the first, second, or third nodes FD1, FD2, or FD3 and operated as described herein. As a result, the image sensing device including such a pixel array PA and/or operated as described herein (e.g., based on operation of the driving unit 1180) may provide images having improved image quality (e.g., providing improved LED flicker performance with reduced, minimized, or prevention of exhibiting motion blur in images generated by the image sensor), for example based on having an image quality with improved SNR dip in an illuminance of a dynamic range.

Figure 12:
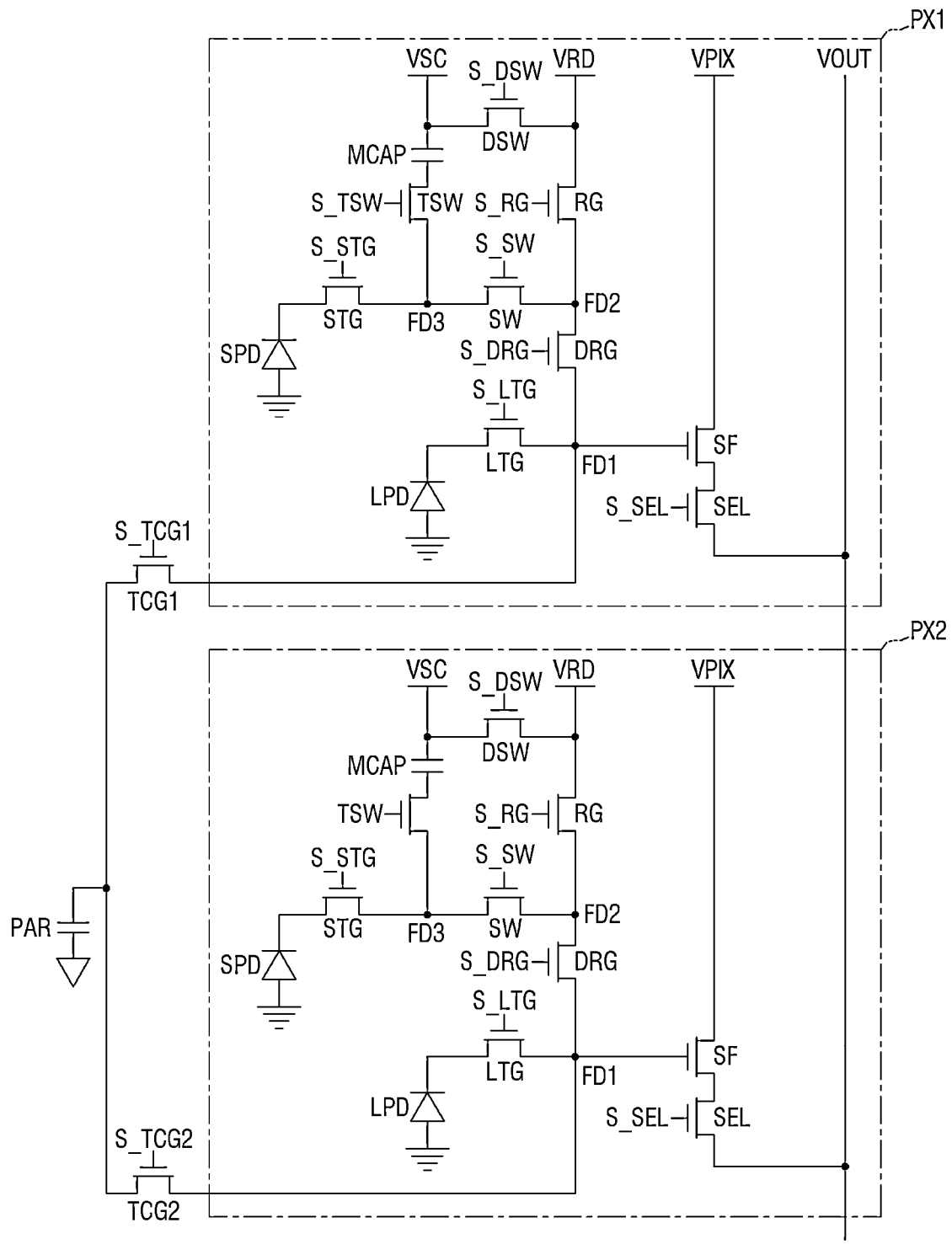
FIGS. 12 and 13 are diagrams showing circuit diagrams of unit-grouped pixels according to some example embodiments.
Figure 13:
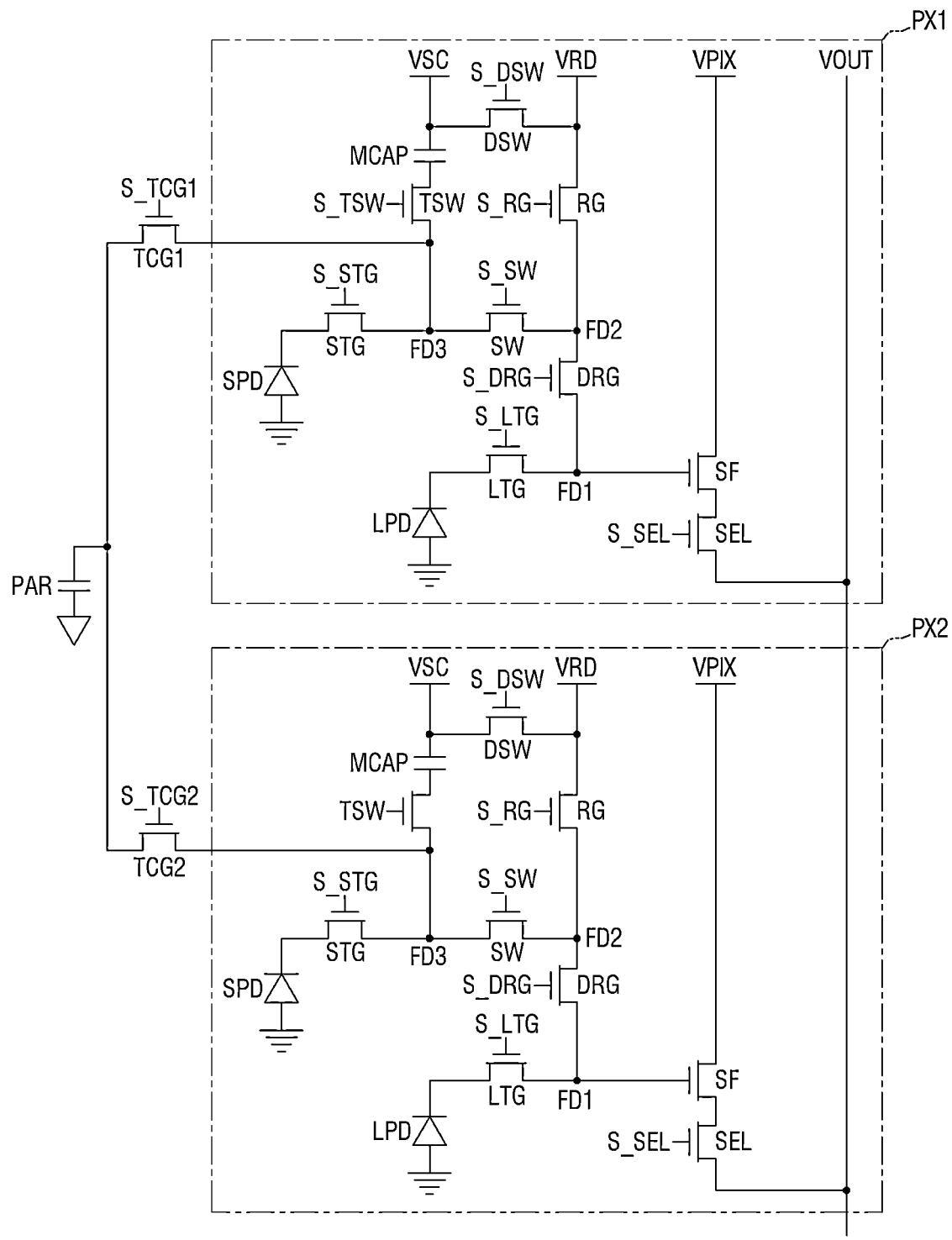

FIGS. 12 and 13 are diagrams showing circuit diagrams of unit-grouped pixels according to some example embodiments. In the shown example, since the specific configuration of the unit pixel PX overlaps that of FIG. 3, a description thereof will not be provided.

Referring to FIG. 12, an FD connecting transistor TCG1 and an FD connecting transistor TCG2 that group the unit pixels PX according to some example embodiments may be connected to respective first nodes FD1 of the unit pixels PX. A first node $FD1_{PX1}$ of the first unit pixel PX1 is connected to one end of the FD connecting transistor TCG1, a first node $FD1_{PX2}$ of the second unit pixel PX2 is connected to one end of the FD connecting transistor TCG2, and the other ends of the FD connecting transistors TCG1 and TCG2 are connected to each other. That is, the first nodes FD1 of the unit pixels PX1 and PX2 are connected to each other according to the FD connecting signal TCG (e.g., S_TCG1 and S_TCG2), and the electric charges transferred to the first floating diffusion region of the unit pixels PX1 and PX2 are subjected to analog-binning and output to the output signal line VOUT.

Referring to FIG. 13, an FD connecting transistor TCG1 and an FD connecting transistor TCG2 that group the unit pixels PX according to some example embodiments may be connected to respective third nodes FD3 of the unit pixels PX. The third node $FD3_{PX1}$ of the first unit pixel PX1 is connected to one end of the FD connecting transistor TCG1, the first node $FD1_{PX2}$ of the second unit pixel PX2 is connected to one end of the FD connecting transistor TCG2, and the other ends of the FD connecting transistors TCG1 and TCG2 are connected to each other. That is, the third nodes FD3 of the unit pixels PX1 and PX2 are connected to each other according to the FD connecting signal TCG (e.g., S_TCG1 and S_TCG2), and the electric charges transferred to the first floating diffusion region of the unit pixels PX1 and PX2 are subjected to analog-binning and output to the output signal line VOUT.

Figure 14:
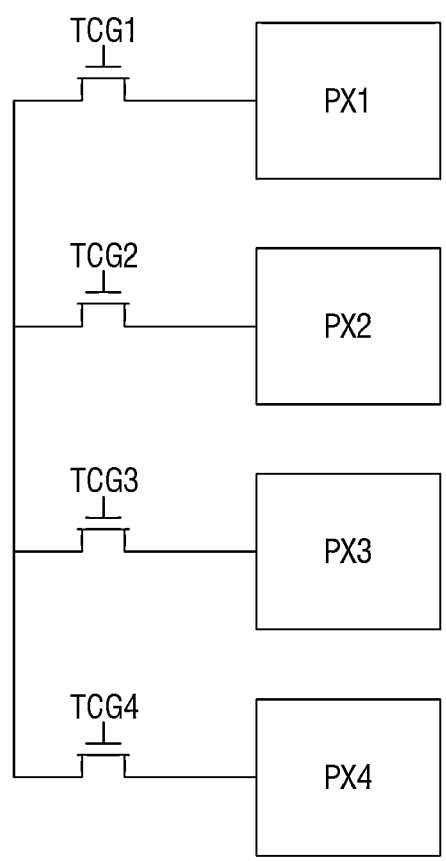
FIGS. 14 and 15 are simplified circuit diagrams of unit-grouped pixels according to some example embodiments.
Figure 15:
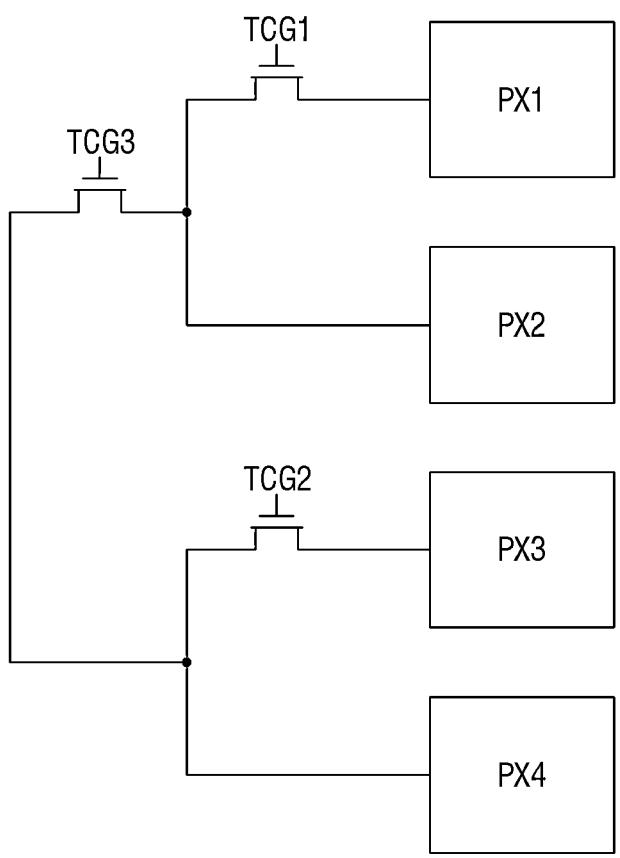

FIGS. 14 and 15 are simplified circuit diagrams of unit-grouped pixels according to some example embodiments.

According to some example embodiments, the pixel array PA may perform analog-binning by grouping the plurality of unit pixels PX through the plurality of FD connecting transistors.

Referring to the example of FIG. 14, four unit pixels PX1, PX2, PX3 and PX4 may be grouped into one unit group through four FD connecting transistors TCG1, TCG2, TCG3 and TCG4. In the shown example, the FD connecting transistors TCG are matched and connected on a one-to-one (1:1) basis for each unit pixel PX.

Referring to the example of FIG. 15, the plurality of unit pixels PX may be grouped into a plurality of steps. For example, the unit pixel PX1 and the unit pixel PX2 may be sub-grouped into the first FD connecting transistor TCG1, and the unit pixel PX3 and the unit pixel PX4 may be sub-grouped into the second FD connecting transistor TCG2. The first subgroups PX1 and PX2 and the second subgroups PX3 and PX3 may be upper-grouped into the third FD connecting transistor TCG3. According to some example embodiments, the third FD connecting transistor TCG3 may be referred to as an upper FD connecting transistor.

Hereinafter, as in some example embodiments, including the example embodiments of FIGS. 16 to 20, the metal wiring for connection with the FD connecting transistor TCG may be implemented to be placed at the shortest length. A specific placement form will be described in detail below.

Figure 16:
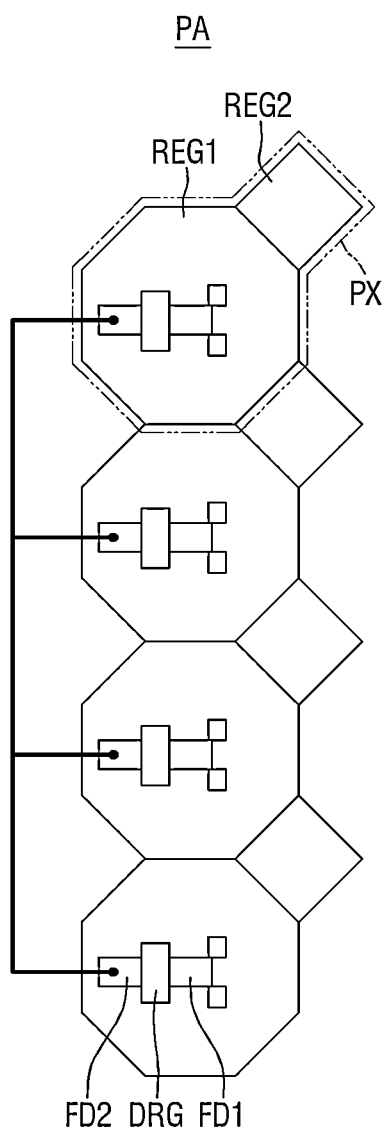
FIGS. 16, 17, and 18 briefly show the layout of unit-grouped pixels according to some example embodiments.
Figure 17:
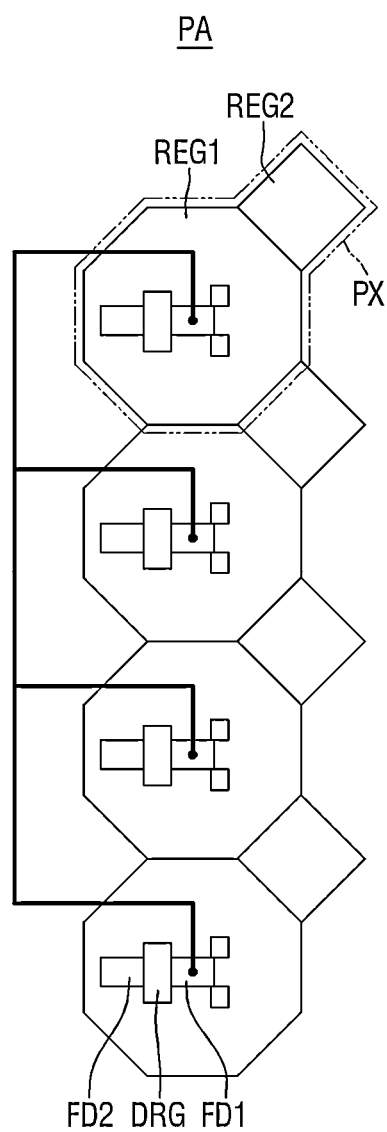
Figure 18:
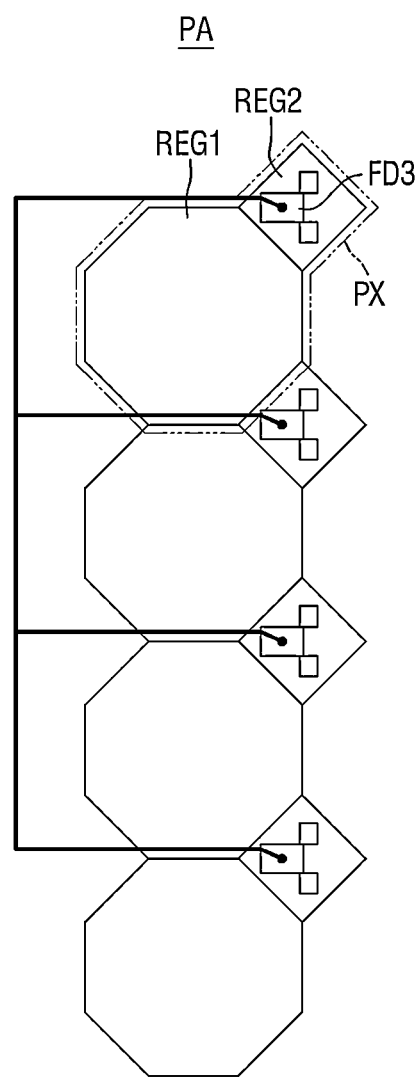

FIGS. 16 to 18 briefly show the layout of unit-grouped pixels according to some example embodiments. FIGS. 16 to 18 show only four pixels PX1, PX2, PX3, and PX4 among the pixel array PA of FIG. 2.

Referring to FIG. 16, the unit pixel PX may include a first region REG1 and a second region REG2. The first region REG1 includes a first photodiode LPD, a switching transistor DRG, a first floating diffusion region FD1, and a second floating diffusion region FD2. The second region REG2 includes a second photodiode SPD and a third floating diffusion region FD3. In the shown example, the first region REG1 may have an octagonal shape, the second region REG2 may have a quadrangular shape, and the second region REG2 is placed to face any one side of the octagons of the first region REG1, but the example embodiments of the invention are not limited thereto.

According to some example embodiments, a connection wiring connected between any one of the first floating diffusion region FD1, the second floating diffusion region FD2, and the third floating diffusion region FD3 and the FD connecting transistor may be placed vertically or horizontally on the basis of an axis of line symmetry between unit pixels. The shape of the connection wiring may be represented by a comb shape or a fork shape having a plurality of branches. However, as long as it has a shape of a scope equivalent to the shown shape, the name is not limited.

For example, when the FD connecting transistor TCG is connected to the second floating diffusion region FD2 (FIG. 5), as shown in FIG. 16, the main connection wiring for connection with the FD connecting transistor TCG may be placed in a straight line in the second floating diffusion regions FD2 located on different rows from each other.

For example, when the FD connecting transistor TCG is connected to the first floating diffusion region FD1 (FIG. 12), as shown in FIG. 17, the main connection wiring for connection with the FD connecting transistor TCG may be placed in a straight line in the second floating diffusion regions FD2 located on different rows from each other.

For example, when the FD connecting transistor TCG is connected to the third floating diffusion region FD3 (FIG. 13), as shown in FIG. 18, the main connection wiring for connection with the FD connecting transistor TCG may be placed in a straight line in the third floating diffusion regions FD3 located on different rows from each other.

Figure 19:
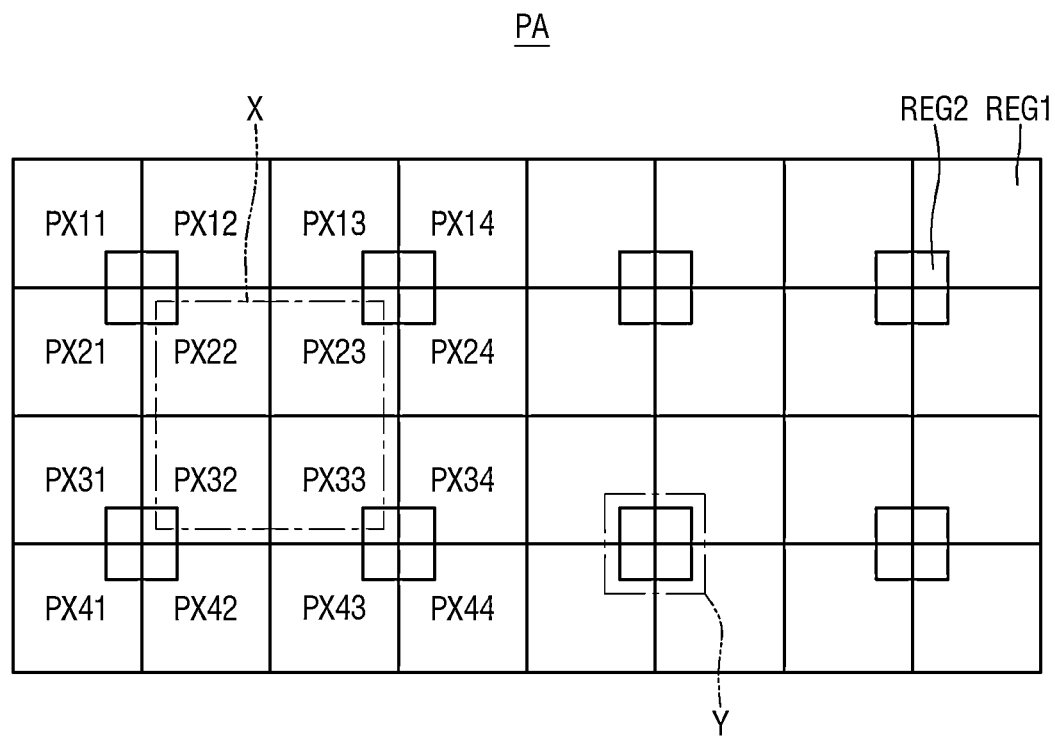
FIG. 19 shows the placement of pixel arrays according to some example embodiments.
Figure 20:
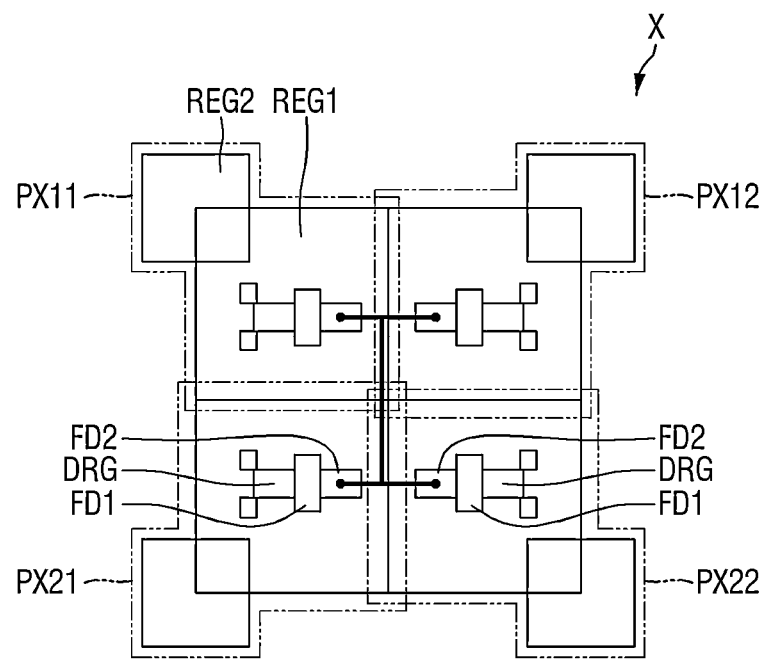
FIG. 20 is an enlarged view of a region X of the pixel array of FIG. 19.
Figure 21:
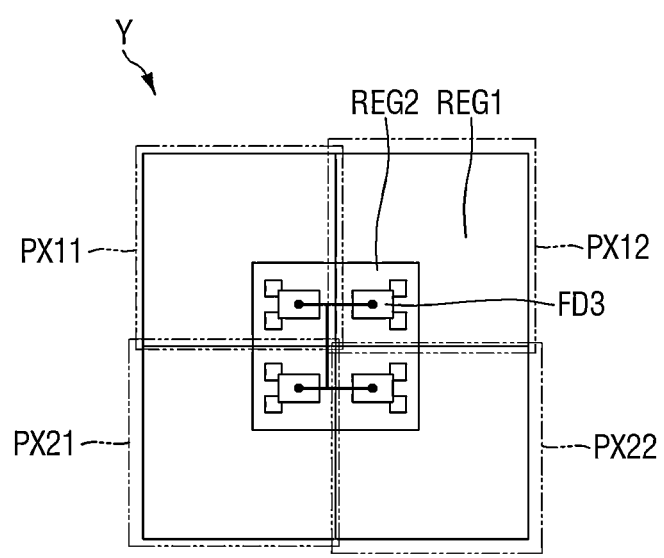
FIG. 21 is an enlarged view of a region Y of the pixel array of FIG. 19.

FIG. 19 shows the placement of pixel arrays according to some example embodiments, FIG. 20 is an enlarged view of a region X of the pixel array of FIG. 19, and FIG. 21 is an enlarged view of a region Y of the pixel array of FIG. 19.

Referring to FIG. 19, a unit pixel PX including a first region REG1 and a second region REG2 according to some example embodiments may be implemented in a rectangular shape. For example, the second region REG2 is formed in a small square shape at any one vertex of the unit pixel PX, and the first region REG1 may be formed in the remaining region obtained by excluding the second region REG2 from the entire region of the unit pixel PX. For example, the first region REG1 may have an angled shape.

According to some example embodiments, the second regions REG2 may be placed such that four second regions REG2 share one vertex. In other words, the second regions REG2 are not spaced apart from each other, and are placed such that one side abuts each other. The first region REG1 may be placed in a first intermediate rectangular shape (e.g., region X) shared by the four unit pixels PX, and the second region REG2 may be placed in a second intermediate rectangular shape (e.g., region Y) shared by the four unit pixels PX.

Referring to FIGS. 20 and 21, when the region X and region Y of FIG. 19 are enlarged, each of the first region REG1 includes the first photodiode LPD, the switching transistor DRG, the first floating diffusion region FD1, and the second floating diffusion region FD2. The second region REG2 includes a second photodiode SPD and a third floating diffusion region FD3.

Referring to FIGS. 19 and 20, the first photodiode LPD, the switching transistor DRG, the first floating diffusion region FD1, the second floating diffusion region FD2 are placed in the first region REG1, in a line-symmetrical shape on the basis of sides facing each other. For example, the first photodiode LPD, the switching transistor DRG, the first floating diffusion region FD1, and the second floating diffusion region FD2 are placed in the first unit pixel PX1 and the second unit pixel PX12, symmetrically about the linear axis facing each other. In addition, the first photodiode LPD, the switching transistor DRG, the first floating diffusion region FD1, and the second floating diffusion region FD2 are placed in the third unit pixel PX21 and the fourth unit pixel PX22, symmetrically about the linear axis facing each other.

In such a placement shape, when the FD connecting transistor TCG is connected to the second floating diffusion region FD2 according to some example embodiments (FIG. 5), the metal wiring for connection with the FD connecting transistor TCG may be placed in an H-shaped (or I-shaped) form in the second floating diffusion regions FD2 of four unit pixels located on different rows and different columns, as in FIG. 20.

In some example embodiments, although not shown, when the FD connecting transistor TCG is connected to the first floating diffusion region FD1 according to some example embodiments (FIG. 12), the metal wiring for connection with the FD connecting transistor TCG may be placed in an H-shaped form in the first floating diffusion regions FD1 of four unit pixels located on different rows and different columns.

Referring to FIGS. 19 and 21, the second photodiode SPD and the third floating diffusion region FD3 are placed in the second region REG2, in a line-symmetrical shape on the basis of the sides facing each other. For example, the third floating diffusion region FD3 is placed in the first unit pixel PX11 and the second unit pixel PX12, symmetrically about the linear axes facing each other. Also, the third floating diffusion region FD3 is placed in the third unit pixel PX21 and the fourth unit pixel PX22 symmetrically about the linear axes facing each other.

In such a placement shape, when the FD connecting transistor TCG is connected to the third floating diffusion region FD3 according to some example embodiments (FIG. 13), the metal wiring for connection with the FD connecting transistor TCG may be placed in an H-shaped (or I-shaped) form in the third floating diffusion regions FD3 of four unit pixels located on different rows and different columns as in FIG. 21.

Figure 22:
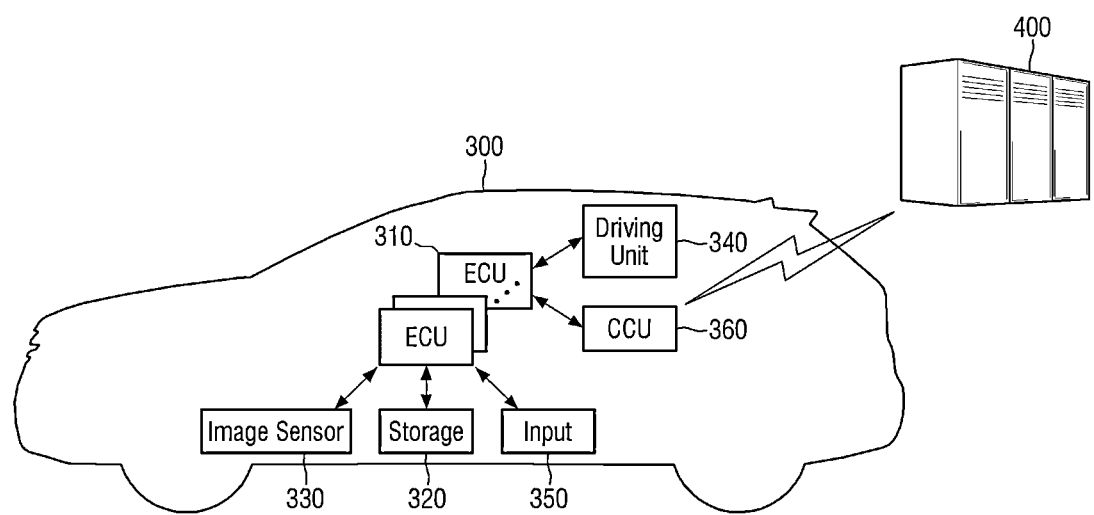
FIG. 22 is a diagram of an automotive device including an image sensor according to some example embodiments.

FIG. 22 is a diagram of an automotive device including an image sensor according to some example embodiments.

Referring to FIG. 22, an automotive device 300 may include a plurality of electronic control units (ECU) 310 and a storage device 320.

Each electronic control unit of the plurality of electronic control units 310 is electrically, mechanically, and communicatively connected to at least one of the plurality of devices provided in the automotive device 300, and may control the operation of at least one device on the basis of any one function execution command.

Here, the plurality of devices may include an image sensor 330 that acquires information required to perform at least one function, and a driving unit 340 that performs at least one function.

For example, the image sensors and/or image sensing devices according to some example embodiments, including any of the example embodiments explained above may be applied to the image sensor 330. The image sensor 330 may correspond to an automotive image sensor.

The driving unit 340 may include a fan and a compressor of an air conditioner, a fan of a ventilation device, an engine and a motor of a power device, a motor of a steering device, a motor and a valve of a braking device, an opening/closing device of a door or a tailgate, and the like.

The plurality of electronic control units 310 may communicate with the image sensor 330 and the driving unit 340 using, for example, at least one of an Ethernet, a low voltage differential signaling (LVDS) communication, or a local interconnect network (LIN) communication.

The plurality of electronic control units 310 determine whether there is a need to perform the function on the basis of the information acquired through the image sensor 330, and when it is determined that there is a need to perform the function, the plurality of electronic control units 310 control the operation of the driving unit 340 that performs the function, and may control an amount of operation of the driving unit 340 on the basis of the acquired information. At this time, the plurality of electronic control units 310 may store the acquired information in the storage device 320, or may read and use the information stored in the storage device 320.

The plurality of electronic control units 310 is able to control the operation of the driving unit 340 that performs the function on the basis of the function execution command that is input through the input unit 350, and is also able to check the setting amount corresponding to the information that is input through the input unit 350 and control the operation of the driving unit 340 that performs the function on the basis of the checked setting amount.

Each electronic control unit 310 may control any one function independently, or may control any one function in cooperation with other electronic control units.

For example, when a distance to an obstacle detected through a distance detection unit is within a reference distance, an electronic control unit of a collision prevention device may output a warning sound for a collision with the obstacle through a speaker.

An electronic control unit of an autonomous driving control device may receive navigation information, road image information, and distance information to obstacles in cooperation with the electronic control unit of the automotive device terminal, the electronic control unit of the image acquisition unit, and the electronic control unit of the collision prevention device, and control the power device, the braking device, and the steering device using the received information, thereby performing the autonomous driving.

A connectivity control unit (CCU) 360 is electrically, mechanically, and communicatively connected to each of the plurality of electronic control units 310, and communicates with each of the plurality of electronic control units 310.

That is, the connectivity control unit 360 is able to directly communicate with a plurality of electronic control units 310 provided inside the automotive device, is able to communicate with an external server 400, and is also able to communicate with an external terminal through an interface.

Here, the connectivity control unit 360 may communicate with the plurality of electronic control units 310, and may communicate with the external server 400, using an antenna (not shown) and a RF communication.

Further, the connectivity control unit 360 may communicate with the server 810 by wireless communication. At this time, the wireless communication between the connectivity control unit 360 and the server 810 may be performed through various wireless communication types such as a GSM (global System for Mobile Communication), a CDMA (Code Division Multiple Access), a WCDMA (Wideband Code Division Multiple Access), a UMTS (universal mobile telecommunications system), a TDMA (Time Division Multiple Access), and an LTE (Long Term Evolution), in addition to a Wifi module and a Wireless broadband module.

In some example embodiments, based on the automotive device 300 including one or more image sensors 330 according to some example embodiments, including a pixel array PA including at least two unit pixels having first and second regions REG1 and REG2 as described herein and a floating diffusion (FD) connecting transistor TCG connected to any one of the first, second, or third nodes FD1, FD2, or FD3, and which may include a driving unit configured to drive the pixel array PA may be driven to alternately perform a normal operation of individually operating the unit pixels, and a binning operation of grouping at least two unit pixels and operating them the at least two unit pixels simultaneously as described herein, the automotive device 300 may be configured to provide improved operation (e.g., improved autonomous driving performed by a driving unit 340 and/or electronic control unit 310) based on the improved quality of images generated by the one or more image sensors 330.

The image sensor explained above is a kind of optical sensor, and the concept according to the example embodiments may be applied to other types of sensors that detect the amount of incident light using semiconductors, fingerprint sensors, distance measurement sensors, and the like, in addition to the image sensor.

As described herein, any devices, systems, units, blocks, circuits, controllers, processors, and/or portions thereof according to any of the example embodiments (including, for example, the image sensing device 1, the image sensor 100, the image signal processor 200, the pixel array PA, the control register block 1110, the timing generator 1120, the row driver 1130, the readout circuit 1150, the ramp signal generator 1160, the buffer 1170, the automotive device, the electronic control units 310, the storage device 320, the image sensor 330, the input unit 350, the driving unit 340, the connectivity control unit 360, the external server 400, any portion thereof, or the like) may include, may be included in, and/or may be implemented by one or more instances of processing circuitry such as hardware including logic circuits; a hardware/software combination such as a processor executing software; or any combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device (e.g., a memory), for example a DRAM device, storing a program of instructions, and a processor (e.g., CPU) configured to execute the program of instructions to implement the functionality and/or methods performed by some or all of any devices, systems, units, blocks, circuits, controllers, processors, and/or portions thereof according to any of the example embodiments.

Although some example embodiments of the present inventive concepts have been described above with reference to the accompanying drawings, those skilled in the art will appreciate that the present inventive concepts may be embodied in other specific forms without changing the technical spirit or essential features of the present inventive concepts. Accordingly, the above-described example embodiments should be understood in all respects as illustrative and not restrictive.

What is claimed is:

1. An image sensing device, comprising:
a pixel array including a plurality of unit pixels; and
a driving unit configured to drive each unit pixel of the plurality of unit pixels,
wherein each unit pixel of the plurality of unit pixels includes
a first region including a first photodiode, a first floating diffusion region, and a second floating diffusion region,
a second region including a second photodiode and a third floating diffusion region, and
a floating diffusion (FD) connecting transistor connected to any one of the first floating diffusion region, the second floating diffusion region, or the third floating diffusion region, and
wherein the driving unit is configured to alternately perform a normal operation of individually operating the plurality of unit pixels, and a binning operation of grouping at least two unit pixels of the plurality of unit pixels and operating the at least two unit pixels simultaneously.

2. The image sensing device of claim 1, wherein
the at least two unit pixels include a first unit pixel and a second unit pixel,
an FD connecting transistor of the first unit pixel is a first FD connecting transistor and an FD connecting transistor of the second unit pixel is a second FD connecting transistor, and
the driving unit is configured to cause the first FD connecting transistor of the first unit pixel and the second FD connecting transistor of the second unit pixel to
both turn off during the normal operation, and
turn on simultaneously at a time of the binning operation.

3. The image sensing device of claim 2, further comprising:
an upper FD connecting transistor connecting the first FD connecting transistor and the second FD connecting transistor,
wherein the driving unit is configured to cause the upper FD connecting transistor, the first FD connecting transistor, and the second FD connecting transistor to
each turn off during the normal operation, and
turn on simultaneously at the time of the binning operation.

4. The image sensing device of claim 1, wherein the driving unit is configured to perform
a first operation of transferring electric charges generated by the first photodiode to the first floating diffusion region and outputting the electric charges transferred to the first floating diffusion region as a first output signal,
a second operation of resetting electric charges accumulated in the first floating diffusion region and the second floating diffusion region and outputting the reset electric charges as a second output signal, and
a third operation of outputting a third output signal based on electric charges generated by the first photodiode and transferred to the first floating diffusion region and the second floating diffusion region.

5. The image sensing device of claim 4,
wherein the driving unit is further configured to perform
a fourth operation of accumulating and reading-out electric charges generated by the second photodiode, using the first floating diffusion region, the second floating diffusion region, the third floating diffusion region, and a capacitor to output a fourth output signal; and
a fifth operation of resetting residual electric charges of the first floating diffusion region, the second floating diffusion region, the third floating diffusion region, and the capacitor to output a fifth output signal, in response to the first operation, the second operation, the third operation, and the fourth operation being completed.

6. The image sensing device of claim 1,
wherein the FD connecting transistor groups and connects unit pixels belonging to adjacent rows or adjacent columns in the pixel array in units of M×N, wherein M and N are natural numbers equal to or greater than 1.

7. The image sensing device of claim 1,
wherein in the pixel array,
the at least two unit pixels include a first unit pixel and a second unit pixel,
the first floating diffusion region and the second floating diffusion region of the first unit pixel are located line-symmetrically with the first floating diffusion region and the second floating diffusion region of the second unit pixel, and
connection wirings of FD connecting transistors of the first unit pixel and the second unit pixel intersect reference axes that are symmetrical with each other or are located in parallel with the reference axes.

8. An image sensing device, comprising:
a pixel array including a plurality of unit pixels; and
a driving unit configured to drive each unit pixel of the plurality of unit pixels to output an output signal,
wherein each unit pixel of the plurality of unit pixels includes
a first photodiode;
a first transfer transistor configured to switch whether to transfer a first electric charge sensed by the first photodiode to a first node, the first node including a first floating diffusion region,
a switching transistor connected between the first node and a second node, the second node including a second floating diffusion region,
a source follower transistor having a gate connected to the first node, the source follower transistor configured to generate the output signal,
a connecting transistor connected between the second node and a third node, the third node including a third floating diffusion region,
a second photodiode;
a second transfer transistor configured to switch whether to transfer a second electric charge sensed by the second photodiode to the third node,
a reset transistor connected to the second node,
a capacitor connected to the third node, and a floating diffusion (FD) connecting transistor having one end connected to any one of the first node, the second node, or the third node, wherein the driving unit is configured to alternately perform a normal operation and a binning operation, the normal operation including turning the FD connecting transistor off, the binning operation including turning the FD connecting transistor on.

9. The image sensing device of claim 8,
wherein the driving unit is configured to perform
  a first operation of transferring electric charges generated by the first photodiode to the first node through the first transfer transistor to output a first output signal,
  a second operation of turning on the reset transistor to reset electric charges accumulated in the first floating diffusion region and the second floating diffusion region to output a second output signal, and
  a third operation of accumulating electric charges generated by the first photodiode in both the first floating diffusion region and the second floating diffusion region to output a third output signal.

10. The image sensing device of claim 9,
wherein in at least two adjacent unit pixels of the plurality of unit pixels, second ends of respective FD connecting transistors of the at least two adjacent unit pixels are connected to each other, and
wherein, the driving unit is configured to cause each FD connecting transistor to be turned on at a time of the binning operation, such that analog-binning is performed on the output signal generated based on electric charges accumulated in at least one of the first floating diffusion region, the second floating diffusion region, or the third floating diffusion region of each unit pixel.

11. The image sensing device of claim 9,
wherein the driving unit is further configured to perform
  a fourth operation of transferring electric charges generated by the second photodiode to the third node and the capacitor through the second transfer transistor, and transferring electric charges accumulated in the third node and the capacitor to the second node and the first node to output a fourth output signal, and
  a fifth operation of resetting residual electric charges of the first node, the second node, the third node, and the capacitor to output a fifth output signal, in response to the first operation, the second operation, the third operation, and the fourth operation being completed.

12. The image sensing device of claim 8,
wherein the plurality of unit pixels includes a first unit pixel and a second unit pixel,
wherein each unit pixel of the plurality of unit pixels comprises
  a first region, the first region including the first photodiode, the first floating diffusion region, and the second floating diffusion region, and
  a second region, the second region including the second photodiode and the third floating diffusion region, and
wherein the first region and the second region of the first unit pixel are located line-symmetrically with the first region and the second region of the second unit pixel.

13. The image sensing device of claim 12,
wherein, based on the first region having an octagonal shape,
  a connection wiring connected between any one of the first floating diffusion region, the second floating diffusion region, and the third floating diffusion region and the FD connecting transistor of the each unit pixel is formed vertically or horizontally based on an axis of line symmetry between adjacent unit pixels of the plurality of unit pixels.

14. The image sensing device of claim 12,
wherein, based on the first region having a square shape,
  a connection wiring connected between any one of the first floating diffusion region, the second floating diffusion region, and the third floating diffusion region and the FD connecting transistor of the each unit pixel is formed in an H shape.

15. An image sensing device implemented in an automotive device,
wherein the image sensing device includes a pixel array including a plurality of unit pixels and a driving unit configured to drive each unit pixel of the plurality of unit pixels,
each unit pixel of the plurality of unit pixels comprising:
  a first photodiode;
  a first transfer transistor connected between the first photodiode and a first node, the first node including a first floating diffusion region;
  a switching transistor connected between the first node and a second node, the second node including a second floating diffusion region;
  a source follower transistor having a gate connected to the first node, and a source and a drain connected to an output signal line such that the source follower transistor is configured to generate a first output signal, a second output signal, a third output signal, a fourth output signal, and a fifth output signal;
  a connecting transistor connected between the second node and a third node, the third node including a third floating diffusion region;
  a second photodiode;
  a second transfer transistor connected between the second photodiode and the third node;
  a reset transistor connected between the second node and a first power supply voltage;
  a capacitor connected between the third node and a second power supply voltage; and
  a floating diffusion (FD) connecting transistor having one end connected to the second node.

16. The image sensing device of claim 15,
wherein the driving unit is configured to
  transfer a first electric charge generated by the first photodiode to the first floating diffusion region and the second floating diffusion region to output the first output signal,
  reset electric charges accumulated in the first floating diffusion region and the second floating diffusion region to output the second output signal,
  output a second electric charge generated by the first photodiode and transferred to the first floating diffusion region and the second floating diffusion region, as the third output signal,
  transfer electric charges generated by the second photodiode to the third floating diffusion region and the capacitor to output the fourth output signal, and
  reset residual electric charges of the first floating diffusion region, the second floating diffusion region, the third floating diffusion region, and the capacitor to output the fifth output signal.

17. The image sensing device of claim 15,
wherein another end of a FD connecting transistor of at least one unit pixel of the plurality of unit pixels is connected to another end of a FD connecting transistor of another adjacent unit pixel of the plurality of unit pixels.

18. The image sensing device of claim 15,
wherein each unit pixel comprises:
  a first region, the first region including the first photodiode, the first floating diffusion region, and the second floating diffusion region, and
  a second region, the second region including the second photodiode and the third floating diffusion region,
wherein the plurality of unit pixels includes a first unit pixel and a second unit pixel, and
wherein the first region and the second region of the first unit pixel are located line-symmetrically in the first region and the second region of the second unit pixel.

19. The image sensing device of claim 18,
wherein, based on the first region having an octagonal shape,
a connection wiring connected between the second floating diffusion region and the FD connecting transistor is formed vertically or horizontally based on an axis of line symmetry between adjacent unit pixels of the plurality of unit pixels.

20. The image sensing device of claim 18,
wherein, based on the first region having a square shape,
a connection wiring connected between the second floating diffusion region and the FD connecting transistor is formed in an H shape.

* * * * *